United States Patent
Zils et al.

(10) Patent No.: US 10,730,643 B1
(45) Date of Patent: Aug. 4, 2020

(54) SPACE BASED ROBOTIC ASSEMBLY OF A MODULAR REFLECTOR

(71) Applicant: Space Systems/Loral, LLC, Palo Alto, CA (US)

(72) Inventors: Jude Zils, Santa Cruz, CA (US); Daniel Andrew Fluitt, San Jose, CA (US); Carey Graham Hijmans, Morgan Hill, CA (US); Douglas William Dietz, Menlo Park, CA (US)

(73) Assignee: Space Systems/Loral, LLC, Palo Alto, CA (US)

(*) Notice: Subject to any disclaimer, the term of this patent is extended or adjusted under 35 U.S.C. 154(b) by 725 days.

(21) Appl. No.: 15/654,593

(22) Filed: Jul. 19, 2017

Related U.S. Application Data

(60) Provisional application No. 62/385,162, filed on Sep. 8, 2016.

(51) Int. Cl.
*B64G 4/00* (2006.01)
*B64G 1/10* (2006.01)
*B64G 1/22* (2006.01)

(52) U.S. Cl.
CPC ........... *B64G 1/222* (2013.01); *B64G 1/1007* (2013.01)

(58) Field of Classification Search
CPC ..... B64C 2211/00; B64G 1/222; B64G 1/443; H01Q 1/28
See application file for complete search history.

(56) References Cited

U.S. PATENT DOCUMENTS

| | | | | |
|---|---|---|---|---|
| 4,630,791 A | * | 12/1986 | Chapman | B64G 1/14 136/245 |
| 5,644,322 A | | 7/1997 | Hayes et al. | |
| 5,969,695 A | * | 10/1999 | Bassily | H01Q 1/08 343/912 |
| 6,226,121 B1 | | 5/2001 | Atkinson et al. | |

(Continued)

FOREIGN PATENT DOCUMENTS

JP 2002362500 A 12/2002

OTHER PUBLICATIONS

U.S. Appl. No. 15/160,258, filed May 20, 2016, Helmer et al.

(Continued)

*Primary Examiner* — Brian M O'Hara
(74) *Attorney, Agent, or Firm* — Weaver Austin Villeneuve & Sampson LLP

(57) ABSTRACT

A spacecraft includes a main body structure and a plurality of deployable modular reflector elements, the spacecraft being reconfigurable from a launch configuration to an on-orbit configuration. In the launch configuration, the modular reflector elements are disposed in a storage system that includes an arrangement for supporting the modular reflector elements with respect to dynamic launch loads. In the on-orbit configuration, in some implementations, an assembly of the plurality of modular reflector elements forms a large-aperture, offset fed, reflector, the reflector being coupled with a boom or yoke with the main body structure by way of a two or three axis positioning mechanism configured to steer the reflector with respect to the main body structure. In some implementations, in the on-orbit configuration, the plurality of modular reflector elements are assembled to form a large aperture reflective surface that is self-supporting.

17 Claims, 23 Drawing Sheets

(56) References Cited

U.S. PATENT DOCUMENTS

| | | | |
|---|---|---|---|
| 6,448,940 B1 | 9/2002 | Chiang | |
| 8,448,902 B2 | 5/2013 | Gelon | |
| 8,550,407 B2* | 10/2013 | Vezain | B64G 1/66 |
| | | | 136/245 |
| 8,789,796 B2 | 7/2014 | Boccio et al. | |
| 9,434,485 B1* | 9/2016 | Lehocki | B64G 1/22 |
| 2005/0088734 A1 | 4/2005 | Basu | |
| 2007/0094847 A1* | 5/2007 | Thomson | B64G 1/222 |
| | | | 16/369 |
| 2008/0143636 A1 | 6/2008 | Couchman et al. | |
| 2016/0264264 A1 | 9/2016 | Helmer et al. | |
| 2017/0259946 A1* | 9/2017 | White, Jr. | B64G 1/646 |

OTHER PUBLICATIONS

"ETS-VIII (Engineering Test Satellite-VIII) / Kiku-8," ETS-VIII—eoPortal Directory—Satellite Missions, [retrieved on Nov. 1, 2017 from https://directory.eoportal.org/web/eoportal/satellite-missions/e/ets-viii], 17 pages.

Nishida, S. et al., "A New Space Robot End-effector for On-orbit Reflector Assembly," Japan Aerospace Exploration Agency, Ritsumeikan University, 8 pages.

"The James Webb Space Telescope," Goddard Space Flight Center, [retrieved on Nov. 1, 2017 from https://jwst.nasa.gov/ote.html], 2 pages.

Perrygo et al., "Inflatable truss support structures for future large space telescopes," Swales Aerospace, Inc., ILC Dover, Inc., 26 pages.

\* cited by examiner

Detail J

Detail K

View K-K

Detail L

Detail M

View M-M

Detail N

View N-N

View P-P

Detail R

View R-R

Detail AB

View AB-AB

View AS-AS

Detail AS

Detail AW

Detail AV

View AX-AX

Detail AY

Detail AZ

SPACE BASED ROBOTIC ASSEMBLY OF A MODULAR REFLECTOR

CROSS-REFERENCE TO RELATED APPLICATIONS

This disclosure claims priority to U.S. Provisional Patent Application No. 62/385,162, filed Sep. 8, 2016, entitled "SPACE BASED ROBOTIC ASSEMBLY OF A MODULAR ANTENNA REFLECTOR", and assigned to the assignee hereof, the disclosure of which is hereby incorporated by reference in its entirety into this Patent Application for all purposes.

TECHNICAL FIELD

This invention relates generally to communications satellites, and more particularly to improved techniques for reconfiguring a satellite from a launch configuration to an on-orbit configuration by robotically assembling, on-orbit, from modular elements a large reflector subsequent to launch.

BACKGROUND

The assignee of the present invention manufactures and deploys spacecraft for, inter alia, communications, scientific exploration, earth observation, transportation or habitation, and broadcast services. Market demands for such spacecraft have imposed increasingly stringent requirements on spacecraft payload capacity. To meet these demands, spacecraft with reflectors having an increased aperture size are desirable.

Launch vehicle compatibility is a second requirement faced by a spacecraft designer. The increased performance requirements are only advantageously met if compatibility with conventional, commercially available launch vehicles is maintained. Accordingly, a spacecraft, as configured for launch, is desirably made compatible with fairing envelope constraints of such launch vehicles as, for example, Ariane V, Atlas XEPF, Proton, Falcon 9, and Sea Launch. As a result, it is very often a requirement to reconfigure a spacecraft from a launch configuration to an on-orbit configuration. Some techniques related to this requirement are disclosed in U.S. Pat. Nos. 5,644,322, 6,448,940, 8,789,796 and 8,448,902, assigned to the assignee of the present disclosure, and in U.S. patent application Ser. Nos. 14/642,486 and 15/160,258, assigned to the assignee of the present disclosure, the disclosures of which are hereby incorporated by reference into the present disclosure in their entirety for all purposes.

In the absence of the presently disclosed techniques, reflector aperture size is substantially limited by launch vehicle fairing dimensions. For example, the aperture diameter of a rigid reflector may not, generally, exceed an inner diameter of the launch vehicle fairing. Even for an unfurlable reflector, the aperture diameter of the reflector in the on-orbit configuration may still be limited by the height of the fairing. Moreover, such unfurlable reflectors are often optically inferior to rigid reflectors.

Thus, improved techniques for enabling a spacecraft, in the on orbit configuration, to have one or more very large aperture reflectors are desirable.

SUMMARY

According to some implementations, a spacecraft includes a main body structure and a plurality of deployable modular reflector elements, the spacecraft being reconfigurable from a launch configuration to an on-orbit configuration. In the launch configuration, the modular reflector elements are disposed in a storage system that includes an arrangement for supporting the modular reflector elements with respect to dynamic launch loads. In the on-orbit configuration, an assembly of the plurality of modular reflector elements forms a large-aperture, offset fed, reflector, the reflector being coupled with a boom or yoke with the main body structure by way of a two or three axis positioning mechanism configured to steer the reflector with respect to the main body structure.

In some examples, the spacecraft may further include a robotic manipulator configured to assemble the large-aperture reflector from the plurality of deployable modular reflector elements. In some examples, the robotic manipulator may include a first end effector configured to connect with a grappling fixture of the main body structure that provides an electrical and telemetry/command interface between the manipulator and the main body, and a second end effector configured to detachably engage at least one of the plurality of modular reflector elements by a mechanical arrangement that does not include an electrical or telemetry/command interface between the manipulator and the at least one modular reflector element.

In some examples, the assembly of the modular reflector elements may include one or both of self-aligning kinematic and magnetic interfaces that couple adjacent modular elements. In some examples, in the on-orbit configuration, the plurality of deployable modular reflector elements may be assembled such that the reflector is substantially self-supporting. In some examples, the self-aligning kinematic and magnetic interfaces may result in couplings between modular reflector elements that are sufficiently rigid and well-aligned to provide a satisfactory optical surface without recourse to external mechanical support structures.

In some examples, the assembly of the modular elements may include couplings between adjacent modular reflector elements, the couplings including one or more of magnetic, mechanical, adhesive, and welded interface.

In some examples, the assembly of the modular reflector elements may include couplings between adjacent modular elements, the couplings including one or both of electrical and telemetry connections.

In some examples, in the on-orbit configuration, the plurality of deployable reflector module elements may be disposed in a geometrically nested arrangement such that facing edges of adjacent reflector module elements are substantially parallel and separated by little or no gap.

According to some implementations, a spacecraft includes a main body structure and a plurality of deployable modular reflector elements, the spacecraft being reconfigurable from a launch configuration to an on-orbit configuration. In the launch configuration, the modular reflector elements are disposed in a storage system that includes an arrangement for supporting the modular reflector elements with respect to dynamic launch loads. In the on-orbit configuration, the plurality of modular reflector elements are assembled to form a large aperture reflective surface that is self-supporting.

In some examples, in the on-orbit configuration, the reflective surface may be coupled with a deployable boom or yoke to the main body structure. In some examples, in the on-orbit configuration, the reflective surface may be coupled with the boom or yoke to the main body structure by a two or three axis positioning mechanism configured to steer the reflective surface with respect to the main body structure. In some examples, in the on-orbit configuration, the reflective surface may be fixedly coupled with the boom or yoke to the main body structure.

In some examples, the reflective surface may be disposed in an optical configuration suitable to one or both of electromagnetic energy reception and electromagnetic energy transmission, the optical configuration being one or a combination of off-axis, prime focus, Newtonian, Gregorian, Cassegrain, Coude, and axial/front feed configurations.

In some examples, the reflective surface may have a direct structural coupling to the main body structure or a secondary structure connected to the main body structure, the direct structural coupling excluding a deployable boom or yoke.

In some examples, the reflective surface may have an articulable coupling to the main body structure or a secondary structure connected to the main body structure, the articulable coupling including a two or three axis positioning mechanism configured to steer the reflective surface with respect to the main body structure, the articulable coupling excluding a deployable boom or yoke.

In some examples, the spacecraft may further include a robotic manipulator configured to assemble the reflective surface from the plurality of deployable modular reflector elements.

According to some implementations, a method for reconfiguring a first spacecraft from a launch configuration to an on-orbit configuration includes assembling a plurality of deployable modular reflector elements to form a large-aperture reflective surface. The first spacecraft includes a main body structure. In the launch configuration, the modular reflector elements are disposed in a storage system that includes an arrangement for supporting the reflector modular elements with respect to dynamic launch loads. In the on-orbit configuration, the large-aperture reflective surface is self-supporting.

In some examples, the method may further include steering the large aperture reflective surface with respect to the main body structure.

In some examples, assembling the plurality of deployable modular reflector elements may include using one or more robotic manipulators configured to assemble the large-aperture reflective surface from the plurality of deployable modular reflector elements. In some examples, at least one of the robotic manipulators may be disposed on a second spacecraft, separate from the first spacecraft.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Figure 1:
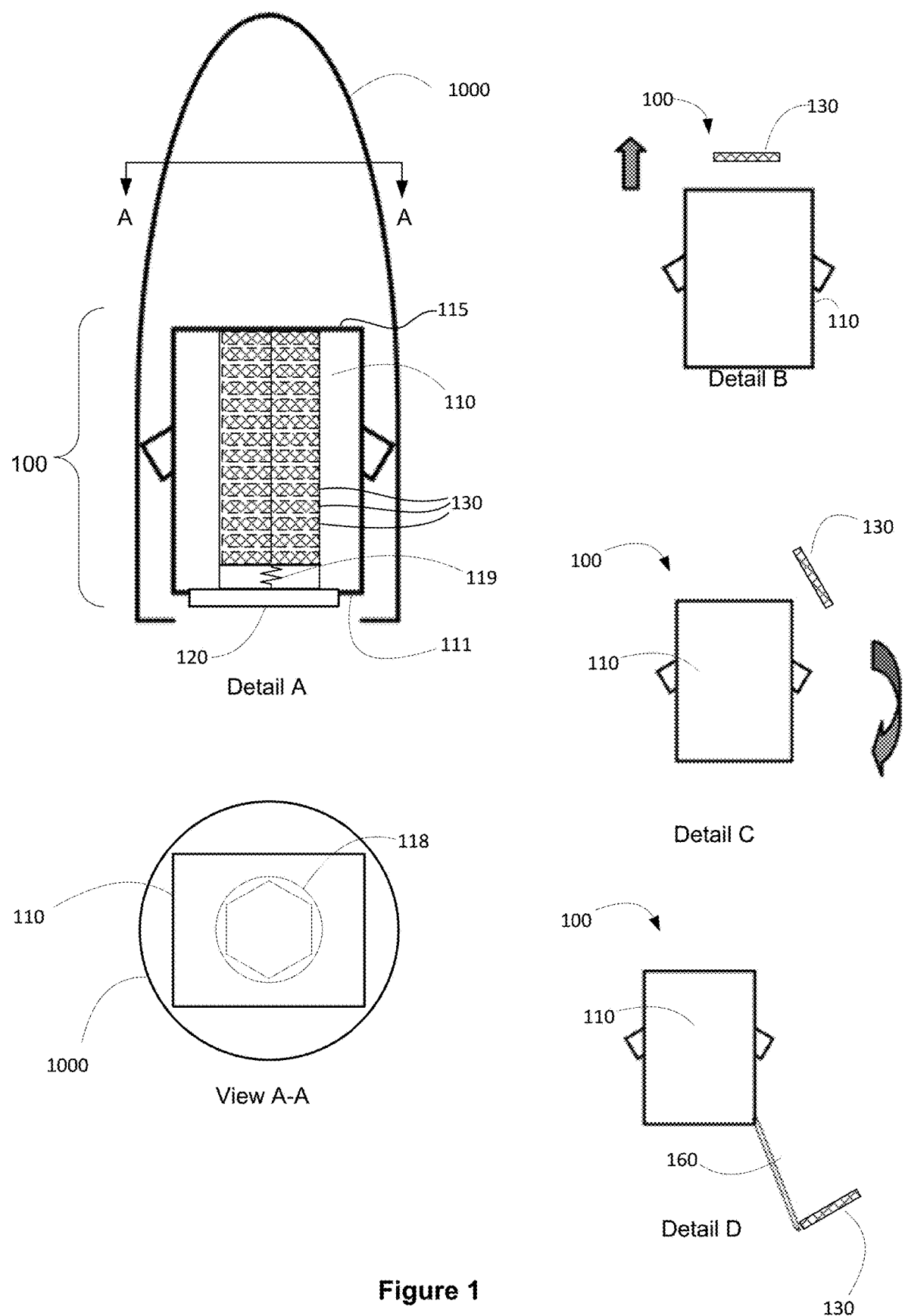
FIG. 1 illustrates an example of a spacecraft reconfigurable from a launch configuration to an on-orbit configuration in accordance with an implementation.

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening features may be present. Furthermore, "connected" or "coupled" as used herein may include wirelessly connected or coupled. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The present inventors have appreciated that a spacecraft may be configured with one or more reflectors, each reflector being composed of an assembly of a number of modular elements. In some implementations, the assembly is substantially self-supporting, meaning that couplings between modular elements are sufficiently rigid and well-aligned to provide a satisfactory optical surface without recourse to external mechanical support structures. A "reflector" as the term is used herein, and in the claims may refer to an optically reflective surface and/or to a radio frequency antenna reflector. In some implementations, a reflector may be a large aperture, offset fed antenna reflector, the antenna reflector being coupled with a boom or yoke with the main body structure by way of a two or three axis positioning mechanism configured to steer the reflector with respect to the spacecraft main body. The reflector may be configured to operate in one or more of a variety of optical configurations, including, for example one or a combination of off-axis, prime focus, Newtonian, Gregorian, Cassegrain, Coude, and axial/front feed configurations.

The modular elements may be, in a launch configuration, stacked compactly in a cylinder-like dispenser or a compartmentalized storage system, or stowed on the exterior of the spacecraft, and the spacecraft may be reconfigured to the on-orbit configuration by using a robotic manipulator to assemble the modular elements into the one or more reflectors. As a result, an aperture diameter of any assembled reflector may be much larger than any internal dimension of the launch vehicle fairing. In some implementations the aperture diameter may exceed three meters; in other implementations, the aperture diameter may exceed five meters, for example. In some implementations, a multipurpose manipulator may be configured for grasping, moving and attaching the modular elements into positions in order to form an assembled reflector.

FIG. 1 illustrates an example of a spacecraft reconfigurable from a launch configuration to an on-orbit configuration in accordance with an implementation. Referring first to Detail A, a spacecraft 100 is depicted, as configured in a launch configuration, within a launch vehicle fairing 1000. The spacecraft 100 may include a main body structure 110 disposed between and defining an aft surface 111 and a forward surface 115. The aft surface 111 may be disposed proximate to a structural interface adapter 120. The structural interface adapter 120 may be configured to mate with a launch vehicle upper stage (not illustrated). In the illustrated implementation, a plurality of modular reflector elements 130 are vertically stacked, in the launch configuration, within a dispenser/storage system 118. Each modular element 130 may be a relatively small portion of a much larger reflector that is to be assembled on-orbit (i.e., after launch).

In the launch configuration, the modular elements 130 may be supported with the dispenser/storage system 118 by way of one or more arrangements (not illustrated) that support the modular elements 130 during launch, and facilitate deployment of ("dispensing") the modular elements 130 once the spacecraft has reached orbit. The arrangements may be configured to support and/or protect the modular elements 130 in the face of dynamic launch loads, and may include one or more spring arrangements 119 or one or more mechanical or magnetic retention and release devices. In some implementations, spring arrangements 119, in cooperation, for example, with latch and release mechanisms (not illustrated) may be configured to urge each modular element 130, one element at a time, into a position proximate to the forward surface 115, from which the modular element 130 may be dispensed. As a result of being dispensed, the modular element 130 may be free to be moved into the on-orbit configuration as described below.

Referring now to Detail B, a configuration is illustrated that may occur as part of a transition between the launch configuration illustrated in Detail A and the on-orbit configuration illustrated in Detail D. In the illustrated "transition configuration" of Detail B, one of the plurality of modular elements 130 has been separated a distance forward of the forward surface 115 of the spacecraft main body 110.

In a second transition configuration illustrated in Detail C, the modular element 130 is depicted as being rotated substantially outboard of the spacecraft main body toward a position consistent with a desired on-orbit configuration (Detail D).

Referring now to Detail D, the spacecraft 100 is illustrated in an on-orbit configuration in which the modular element 130 is mechanically attached with the spacecraft body 110 by way of a structural arrangement 160 in a position that is substantially outboard of the main body structure. In some implementations, the structural arrangement 160 may be a boom or yoke having an articulable connection with the spacecraft main body 110. For example, the structural arrangement 160 may include one or more hinged joints and/or actuators. In other implementations, the arrangement 160 may be fixedly attached with the spacecraft main body 110. In some implementations, the arrangement 160 may include a two or three axis positioning mechanism (not illustrated) configured to steer the modular element 130.

It should be noted that in a transition configuration (e.g., as illustrated in Detail B and in Detail C) the arrangement 160 is detached from the modular element 130. As will be described in more detail hereinbelow, in some implementations the transition configuration includes the modular element 130 being coupled with the spacecraft only by way of a mechanical linkage (not illustrated) between the modular element 130 and the spacecraft main body 110. The mechanical linkage may include a manipulator, for example a ground controlled telerobotic arm or other manipulator, and may exclude arrangement 160. In some implementations, the manipulator may be a self-relocatable manipulator that includes one or more features described in U.S. Pat. Nos. 4,585,388 and 4,929,009, the disclosures of which are hereby incorporated by reference into the present application.

Figure 2:
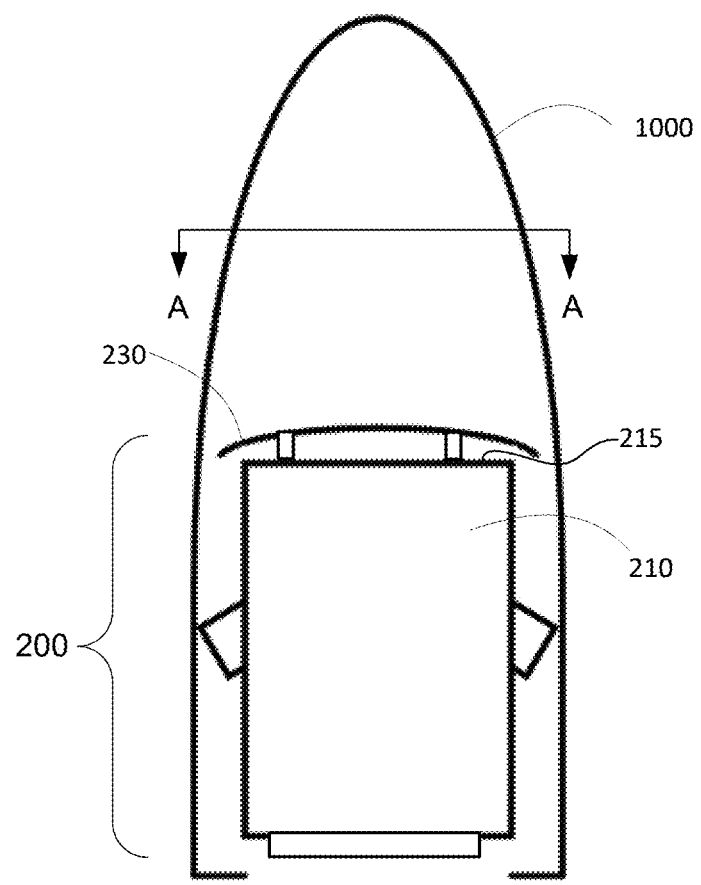
FIG. 2 illustrates an example of a spacecraft arranged in the absence of the present teachings.

Features and benefits of the presently disclosed techniques may be better appreciated by comparing the above-described configurations with a spacecraft arranged in the absence of the present teachings, as illustrated in FIG. 2. In the launch configuration illustrated in FIG. 2, at least one reflector 230 of a spacecraft 200 is stowed above forward surface 215 of main body 210. In the illustrated arrangement, a diameter of the reflector 230 is limited by the diameter of launch vehicle fairing 1000.

The present inventors have appreciated that a spacecraft antenna reflector may be configured as a plurality of deployable, modular reflector elements configured to be assembled on-orbit. The modular elements may each be a portion of a large aperture reflector that has been partitioned into the smaller modular elements. The modular elements may be configured for assembly on orbit by a robotic manipulator. In some implementations, referring again to FIG. 1, a robotic manipulator (not illustrated) may be configured to remove, one by one, each modular element 130 from the dispenser/storage system 118, and assemble the modular element 130 to the arrangement 160 and/or to one or more adjacent modular elements 130. One or more of the modular elements 130 may be configured to include, for example, self-aligning kinematic interface alignments, mechanical and/or magnetic mounting hardware, adhesives, and/or localized welding to connect to each other such that an assembly of a plurality of the modular elements 130 is self-supporting, at least in a zero-g on-orbit environment. In some implementations, the modular elements 130 may include provisions for coupling electrical power and/or telemetry command signals between adjacent modular elements.

Figure 3:
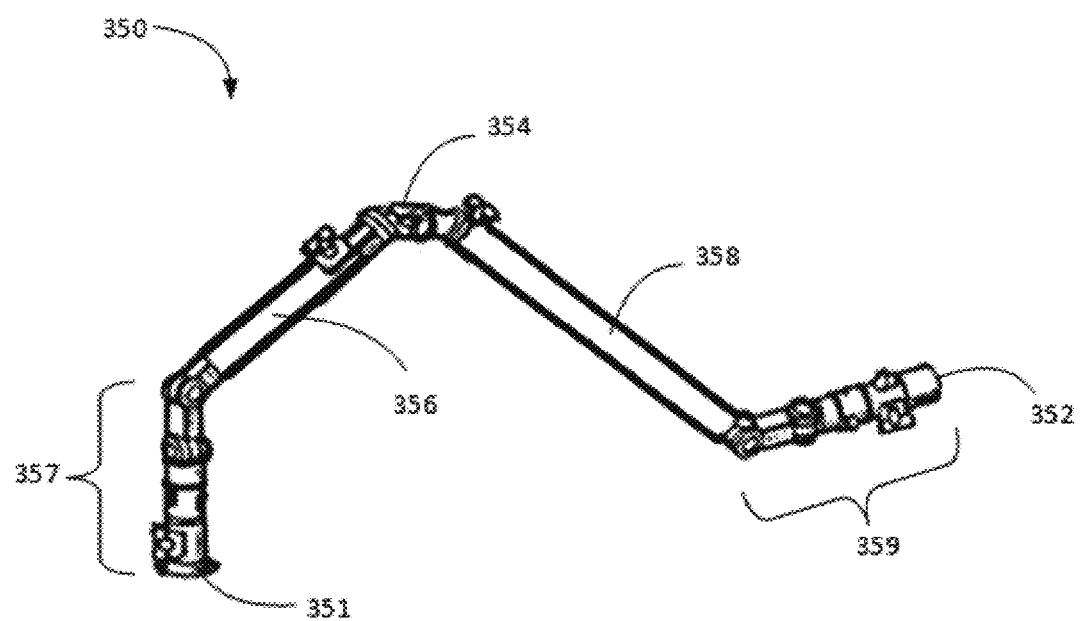
FIG. 3 illustrates an example of a multipurpose manipulator in accordance with an implementation.

In some implementations, the robotic manipulator may include a robotic arm having two end effectors and several articulable joints disposed therebetween. For example, referring now to FIG. 3, an example of a multipurpose manipulator will be described. Manipulator 350 includes first and second longitudinally elongated arms 356 and 358. Respective proximal ends of the arms 356 and 358 may be coupled together by means an elbow joint 354. Articulator 357 including one or more articulable joints may be coupled with a distal end of arm 356. Similarly, articulator 359 may be coupled with a distal end of arm 358. In some implementations one or both of the articulator 357 and the articulator 359 includes a pitch joint, a yaw joint, and a roll joint. First and second end effectors 351 and 352 may be mounted at the respective distal ends of the articulators 357 and 359.

Figure 4A:
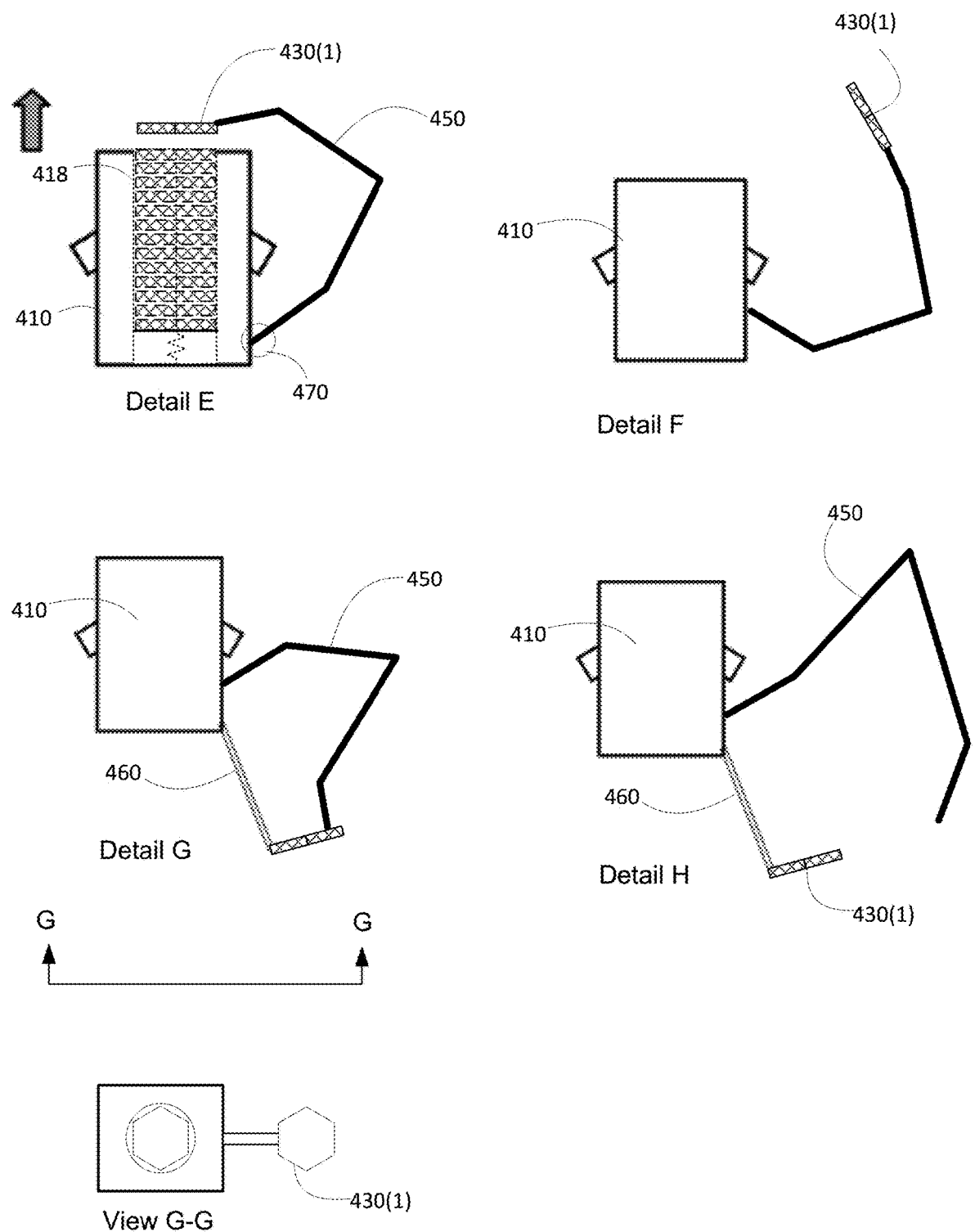
FIGS. 4A-4C illustrate techniques wherein a manipulator is used to move a plurality of modular reflector elements from positions associated with the launch configuration to positions associated with the on-orbit configuration, according to an implementation.
Figure 4B:
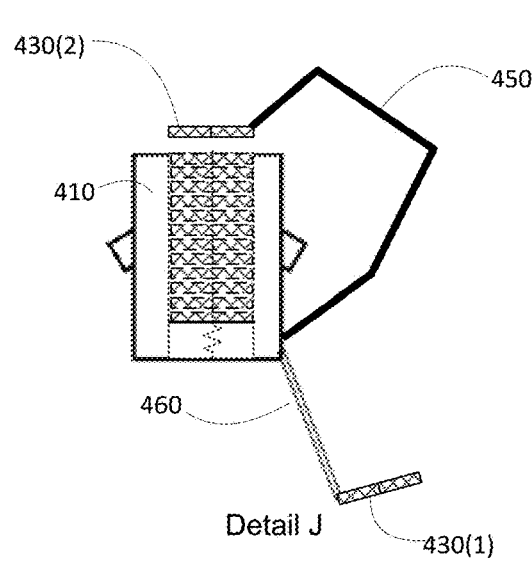
Figure 4B:
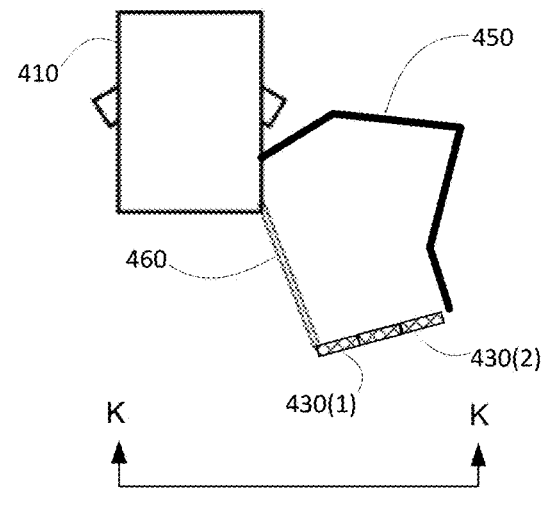
Figure 4B:
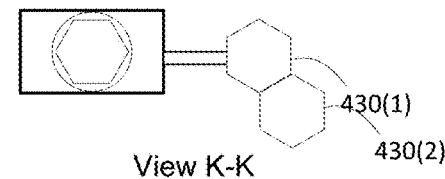
Figure 4B:
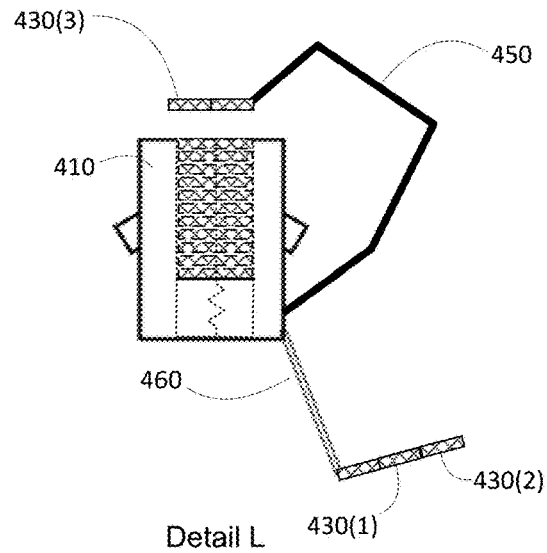
Figure 4B:
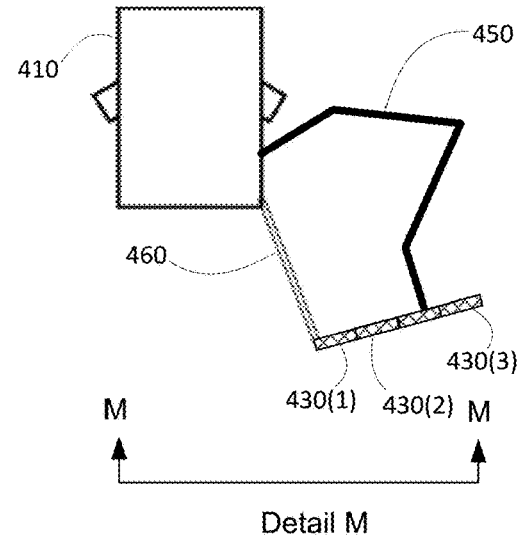
Figure 4B:
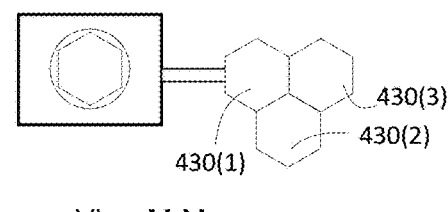
Figure 4C:
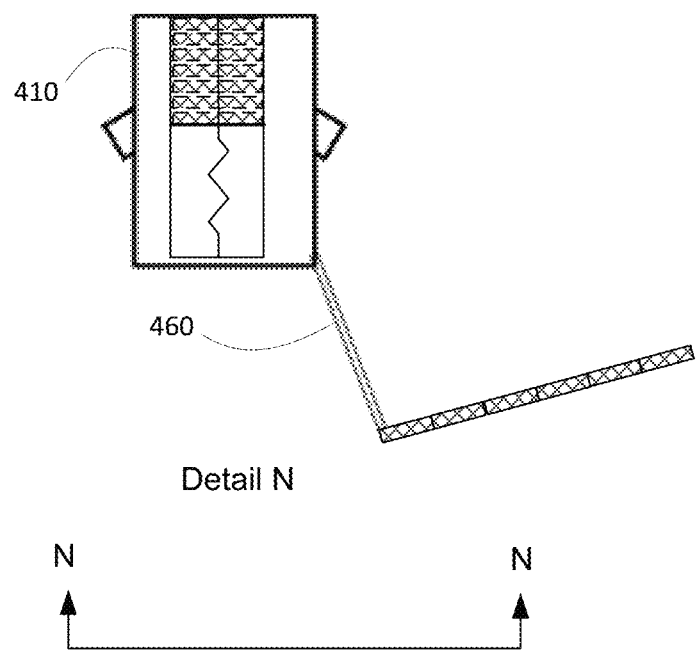
Figure 4C:
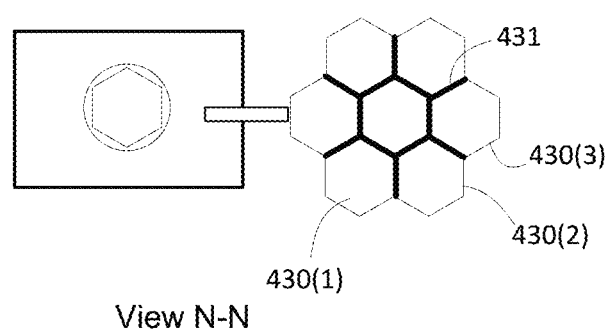

FIGS. 4A-4C illustrate techniques wherein a manipulator 450 is used to move a plurality of modular reflector elements 430 from positions associated with the launch configuration to positions associated with the on-orbit configuration. Referring first to Detail E of FIG. 4A, a configuration is illustrated that may occur as part of a transition between the launch configuration the on-orbit configuration. In the illustrated "transition configuration" of Detail E, a first modular element 430(1) has been separated and/or dispensed from dispenser/storage system 418 and moved away from the spacecraft main body 410 by the manipulator 450. The manipulator 450 may include a proximal portion having a first end effector that is attached to the spacecraft main body 110 at a location 470. The location 470 may include a grappling fixture (not illustrated) with which the first end effector of the manipulator 450 is configured to connect. The grappling fixture may provide an electrical and telemetry/command interface between the manipulator 450 and the spacecraft main body 410, in addition to a mechanical coupling between the manipulator 450 and the spacecraft main body 410. A distal portion of the manipulator 450 may include a second end effector that is detachably engaged with the first modular element 430(1). In some implementations, the second end effector may be detachably engaged with the first modular element 430(1) by a mechanical arrangement that does not include an electrical or telemetry/command interface between the manipulator 450 and the first modular element 430(1).

In a second transition configuration illustrated in Detail F, the modular element 430(1) is depicted as having been translated and rotated, by the manipulator 450, with respect to the spacecraft main body 410 toward a position consistent with a desired on-orbit configuration (Detail G).

Referring now to Detail G, it is illustrated that the manipulator 450 has positioned the first reflector module element 430(1) proximate to a desired on-orbit location. More particularly, in the illustrated configuration, the modular element 430(1) has been positioned proximate to structural arrangement 460 such that it may be coupled with the spacecraft body 410 by way of the structural arrangement 460 which may or may not include a pre-installed reflector element. In some implementations, the manipulator 450 may be configured to attach the first modular element 430(1) to the structural arrangement 460. In other implementations, a core reflector element may be pre-installed (i.e., attached prior to launch to structural arrangement 460, directly or by way of an antenna positioning mechanism). Subsequent to coupling the first modular element 430(1) with the spacecraft body 410, the second end effector of the manipulator 450 may be detached and separated from the modular element 430(1) (Detail H).

As may be better observed in View G-G, the first modular element 430(1) may be approximately hexagonal. In other implementations, some or all of the reflector module elements may each be shaped as approximately a trapezoid (e.g., a half-hexagon) or a polygon of more or less than six sides that may be assembled into a contiguous three dimensional solid.

Referring next to Detail J of FIG. 4B, a second modular reflector element 430(2) is illustrated as having been dispensed and/or retrieved from dispenser/storage system 418 and moved away from the spacecraft main body 410 by the manipulator 450. Referring now to Detail K, it is illustrated that the manipulator 450 has positioned the second modular element 430(2) proximate to the first modular element 430(1) such that the first modular element 430(1) and the second modular element 430(2) may be coupled together. The coupling may be affected with magnetic, mechanical, adhesive, or localized welding means and may include electrical and/or telemetry connections. Advantageously, the coupling may be affected with self-aligning kinematic interfaces such that the coupled assembly of the first modular element 430(1) and the second modular element 430(2) is self-supporting, at least in a zero-g on-orbit environment. In some implementations, the self-aligning kinematic interfaces may be configured to control location and orientation of the first modular element 430(1) with respect to the second modular element 430(2) so that a reflective surface of the coupled assembly is accurately aligned.

Referring next to Detail L of FIG. 4B, a third modular reflector element 430(3) is illustrated as having been dispensed and/or retrieved from dispenser/storage system 418 and moved away from the spacecraft main body 410 by the manipulator 450. Referring now to Detail M, it is illustrated that the manipulator 450 has positioned the third modular element 430(3) proximate to the first modular element 430(1) and the second modular element 430(2) such that the first modular element 430(1), the second modular element 430(2) and the third modular element 430(3) may be coupled together. The coupling may be affected with magnetic, mechanical, adhesive, or localized welding means and may include electrical and/or telemetry connections. Advantageously, the coupling may be affected with self-aligning kinematic interfaces such that the coupled assembly of the first modular element 430(1), the second modular element 430(2) and the third modular element 430(3) is self-supporting, at least in a zero-g on-orbit environment. In some implementations, the self-aligning kinematic interfaces may be configured to control location and orientation of the first modular element 430(1) with respect to the second modular element 430(2) so that a reflective surface of the coupled assembly is accurately aligned.

Referring next to Detail N of FIG. 4C, spacecraft main body 410 is illustrated as being coupled by arrangement 460 with a reflector portion consisting of seven modular reflector elements 430. As may be better observed in View N-N, the seven reflector module elements 430 may be disposed such that gaps 431 between facing edges of adjacent reflector module elements are minimized or effectively eliminated. Such an arrangement may be identified herein as "geometrically nested".

Figure 5:
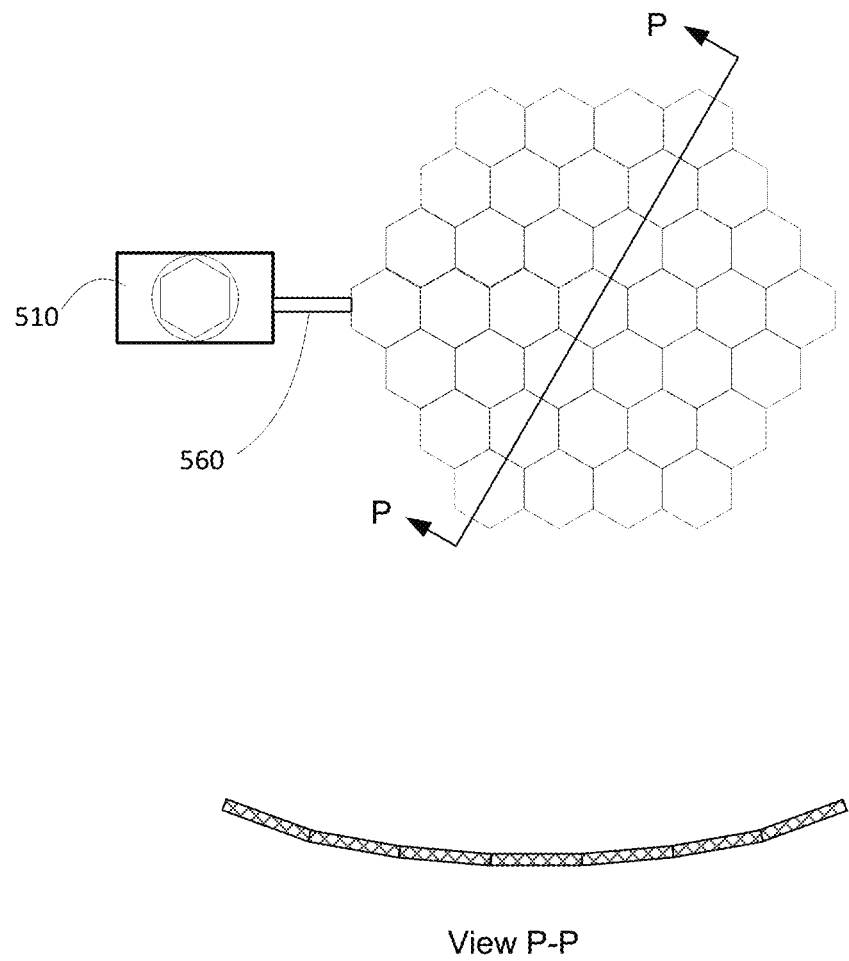
FIG. 5 illustrates an example of a reflector assembly, according to an implementation.

For simplicity of illustration, the illustrated reflector portion includes only seven elements, disposed in a substantially planar geometrically nested arrangement. Turning now to FIG. 5, an example implementation is illustrated that includes 37 reflector module elements disposed in a geometrically nested arrangement. As illustrated in View P-P, the reflector module elements may be configured to form, when assembled together, a reflector having a surface that is substantially parabolic. It will be appreciated that a surface shape other than parabolic may be achieved by judicious selection of modular element geometry and/or geometry of the self-aligning kinematic interfaces. For example, spherical and hyperboloid sections may be formed with or without local shaping.

It will be appreciated that a reflector assembled in accordance with the above disclosed techniques may be substantially larger in diameter than a typical launch vehicle fairing. For example, in some implementations, an array of 169 reflector module elements, each element being nominally 40 cm in size may be assembled in orbit to form a self-supporting hexagonal array of nearly six meters width. Moreover, because the modular reflector elements may be supported during launch by the dispenser/storage system, and experience very low structural loads on orbit, the reflector mass may be substantially smaller than would be anticipated in the absence of the presently disclosed techniques. For example, the present techniques enable at least substantially eliminating a need for reflector backup structures.

Figure 6:
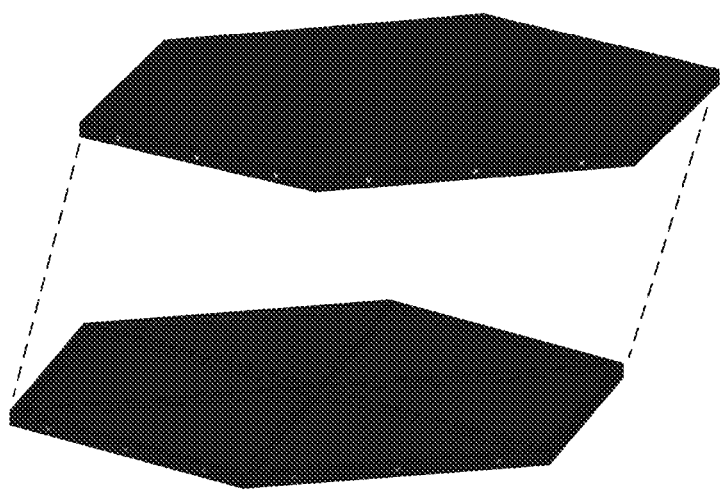
FIG. 6 illustrates an example of a modular reflector element, according to an implementation.

In some implementations, each modular reflector element may include a high conductivity, highly accurate composite reflective surface disposed on a lightweight structural backing, as illustrated in FIG. 6. Each reflector module element may be substantially planar (flat), in some implementations. In other implementations, some or all of the reflector module elements may include a curved reflective surface. In some implementations, some or all of the modular elements may include electrical and/or telemetry connections. Power and/or telemetry and command services may thereby be transferred between adjacent modular elements.

In some implementations, an array of modular reflector elements is designed by partitioning a desired reflector geometry into a large number of geometric elements that are configured to be assembled on-orbit by a robotic appendage. The geometric elements are transported on the spacecraft in a dispenser/storage system disposed in the interior or exterior of the spacecraft.

Figure 7:
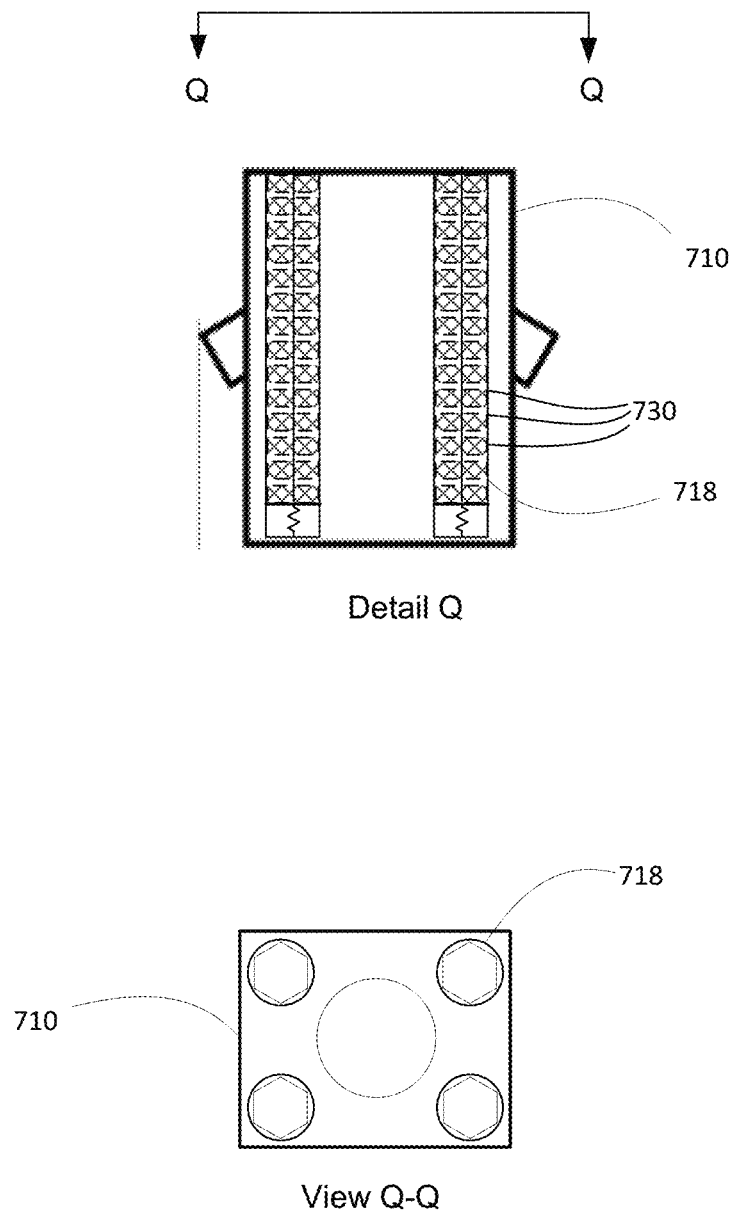
FIG. 7 illustrates an example of a spacecraft reconfigurable from a launch configuration to an on-orbit configuration in accordance with another implementation.

In some implementations, the dispenser/storage system may be a centrally disposed, substantially cylindrical dispenser, as illustrated above. In some implementations, referring to FIG. 7, one or more dispenser/storage systems 718 may be disposed within or proximate to an outboard portion of a spacecraft main body 710. Once on orbit, the reflector elements 730 may be removed from the storage container(s) 718 and assembled by the robotic manipulator. The reflector elements may utilize kinematic interface alignments and mechanical and/or magnetic mounting hardware to connect to each other and may include electrical and/or telemetry connections.

Figure 8:
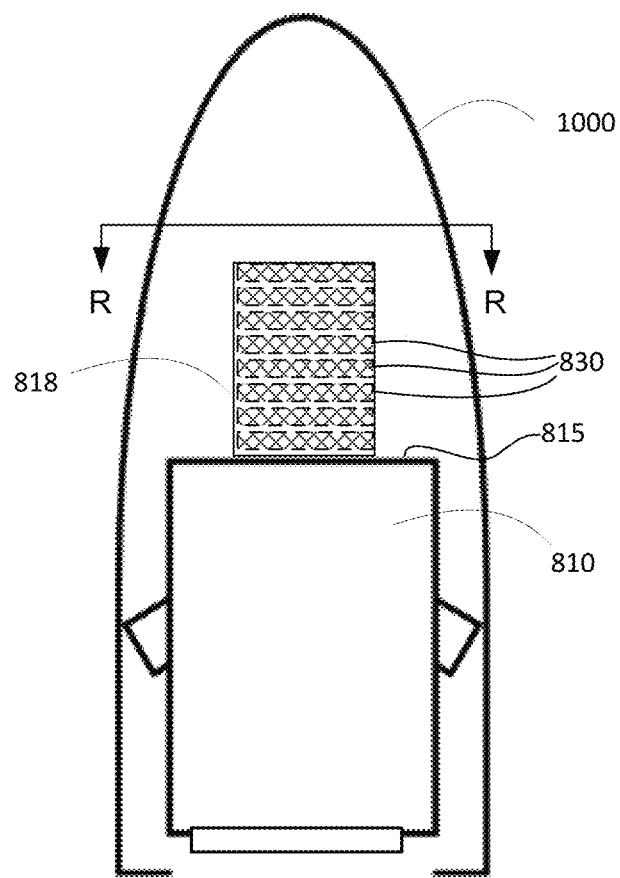
FIG. 8 illustrates an example of a spacecraft reconfigurable from a launch configuration to an on-orbit configuration in accordance with a yet further implementation.
Figure 8:
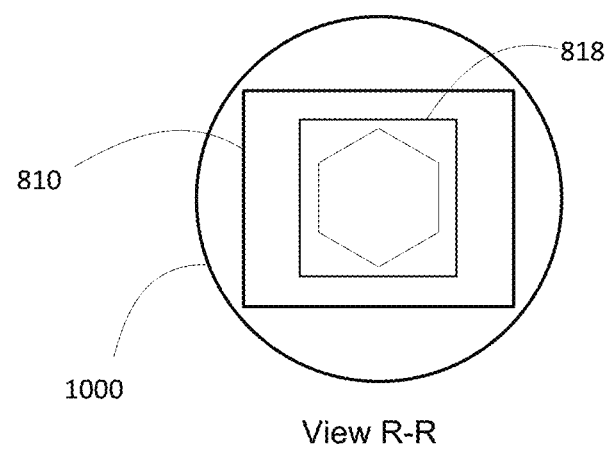

FIG. 8 illustrates an example of a spacecraft reconfigurable from a launch configuration to an on-orbit configuration in accordance with a yet further implementation. In the illustrated implementation, at least one dispenser/storage system 818 is disposed, in the launch configuration on or above a forward surface 815 of a spacecraft main body 810. Once on orbit, the reflector elements 830 may be removed from the storage container(s) 818 and assembled by the robotic manipulator as described below in connection with FIGS. 9A-9C. The reflector elements may utilize kinematic interface alignments and mechanical and/or magnetic mounting hardware to connect to each other and may include electrical and/or telemetry connections. The storage dispenser/storage system 818 may include dispensing mechanisms or may include only support shelving and/or passive structural support interfaces that are configured to be detached by a manipulator (not illustrated). The storage dispenser/storage system 818 may have an approximately square cross section, as illustrated in View R-R, but other cross sections are also contemplated by the present disclosure.

Figure 9A:
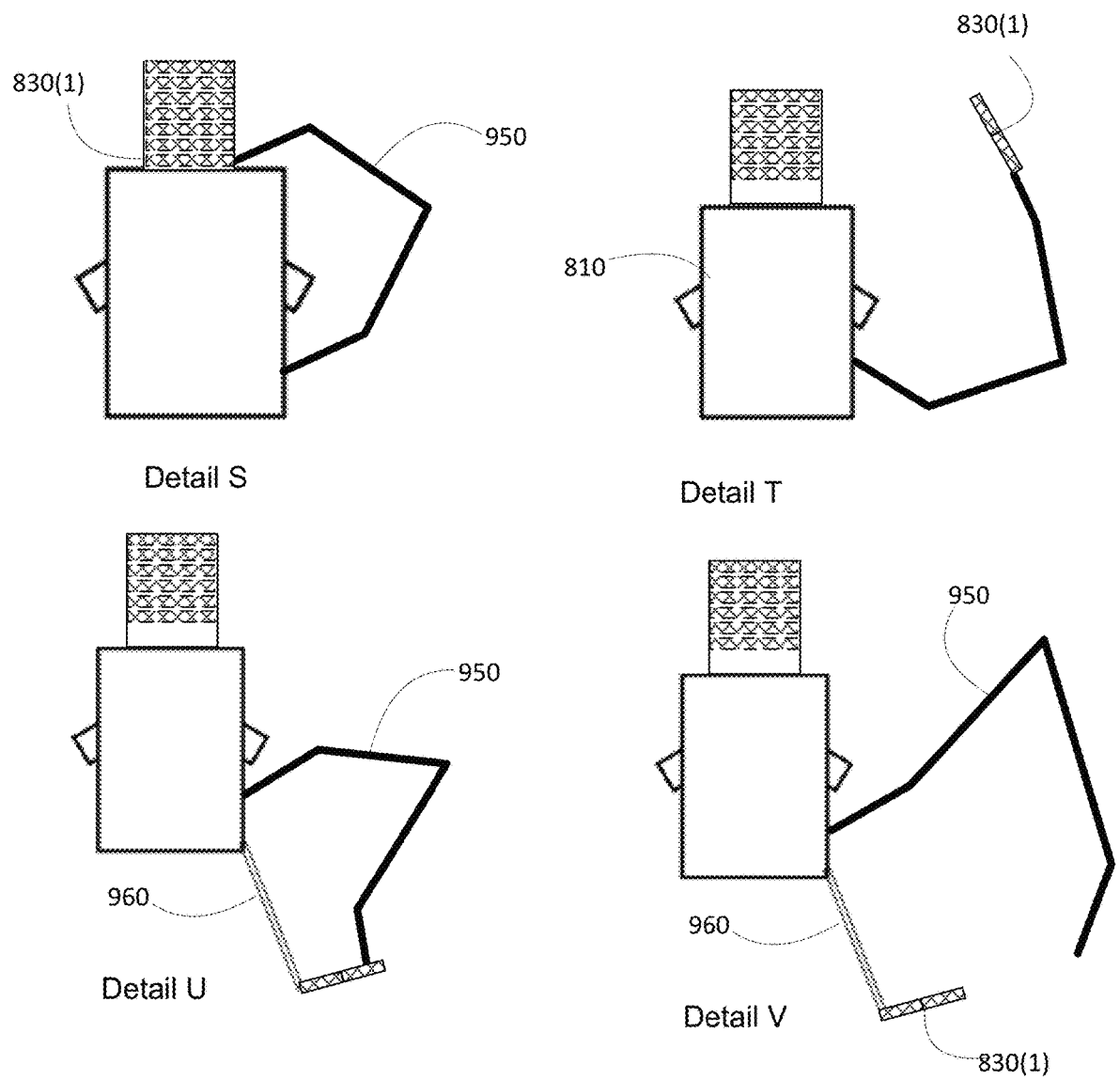
FIGS. 9A-9C illustrate techniques wherein a manipulator is used to move modular reflector elements from positions associated with the launch configuration to positions associated with the on-orbit configuration in accordance with another implementation.
Figure 9B:
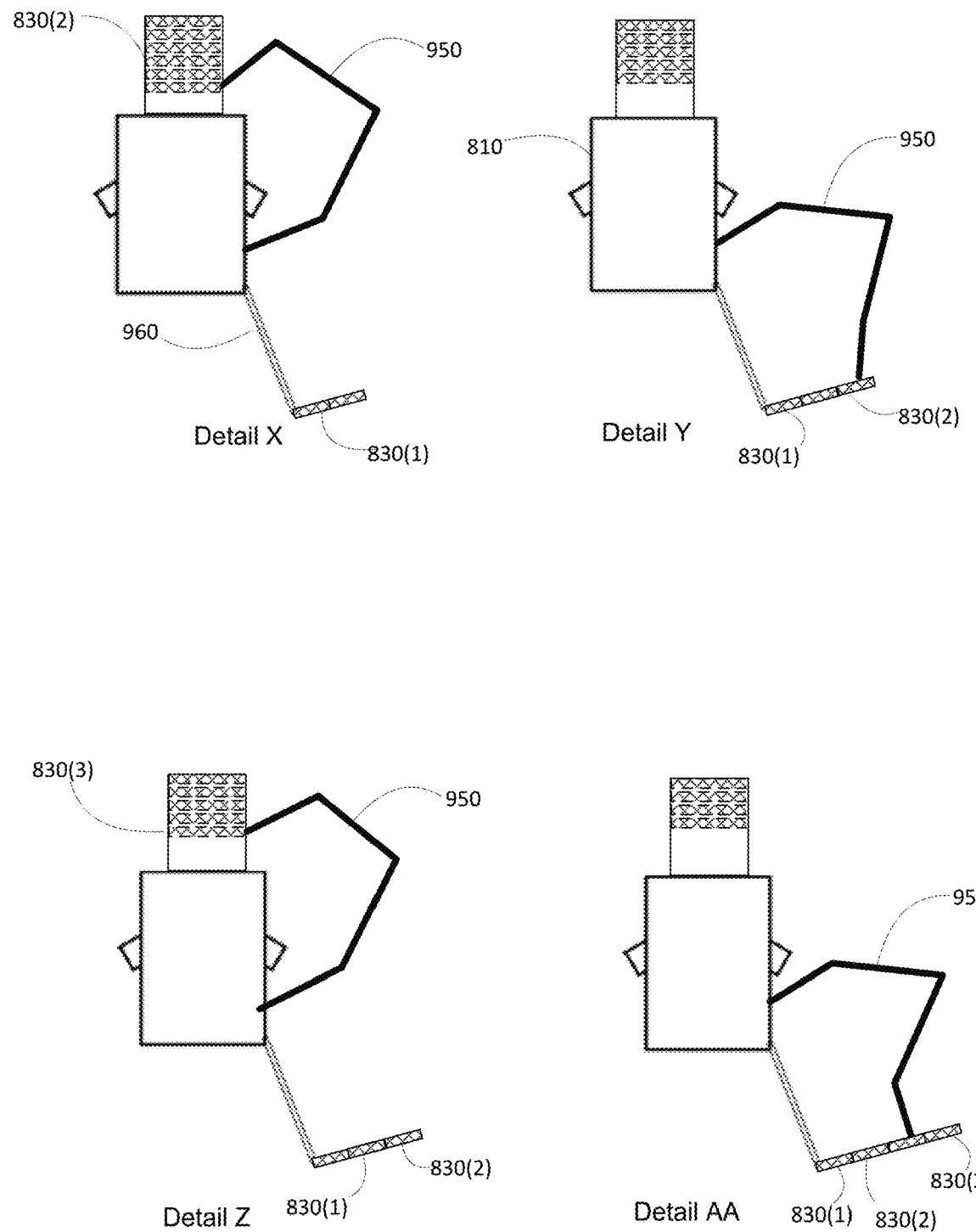
Figure 9C:
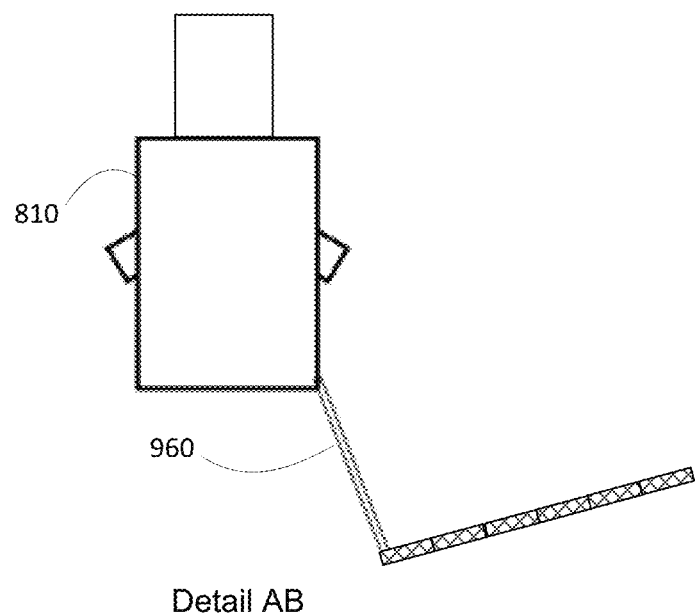
Figure 9C:
Figure 9C:
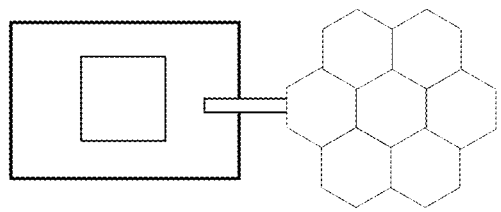

FIGS. 9A-9C illustrate techniques wherein a manipulator 950 is used to move modular reflector elements 830 from positions associated with the launch configuration to positions associated with the on-orbit configuration. Referring first to Detail S of FIG. 9A, a configuration is illustrated wherein an end effector at a distal portion of the manipulator 950 has engaged with a first modular element 830(1). In some implementations, the end effector may be detachably engaged with the first modular element 830(1) by a mechanical arrangement that does not include an electrical or telemetry/command interface between the manipulator 950 and the first modular element 830(1).

In a second transition configuration illustrated in Detail T, the first modular element 830(1) is depicted as having been translated and rotated, by the manipulator 950, with respect to the spacecraft main body 810 toward a position consistent with a desired on-orbit configuration (Detail U).

Referring now to Detail U, it is illustrated that the manipulator 950 has positioned the first modular element 830(1) proximate to a desired on-orbit location. More particularly, in the illustrated configuration, the first modular element 830(1) has been positioned proximate to structural arrangement 960 such that it may be attached with the spacecraft body 810 by way of the structural arrangement 960 which may or may not include a preinstalled reflector element. In some implementations, the manipulator 950 may be configured to attach the first modular element 830(1) to the structural arrangement 960. Subsequent to attaching the first modular element 830(1) to the structural arrangement 960, the end effector of the manipulator 950 may be detached and separated from the first modular element 830(1) (Detail V).

Referring next to Detail X of FIG. 9B, a second modular reflector element 830(2) is illustrated as having been engaged by the end effector of the manipulator 950. Referring now to Detail Y, it is illustrated that the manipulator 950 has positioned the second modular element 830(2) proximate to the first modular element 830(1) such that the first modular element 830(1) and the second modular element 830(2) may be coupled together. The coupling may be affected with magnetic, mechanical, adhesive, or localized welding means and may include electrical and/or telemetry connections. Advantageously, the coupling may be affected with self-aligning kinematic interfaces such that the coupled assembly of the first modular element 830(1) and the second modular element 830(2) is self-supporting, at least in a zero-g on-orbit environment. In some implementations, the self-aligning kinematic interfaces may be configured to control location and orientation of the first modular element 430(1) with respect to the second modular element 430(2) so that a reflective surface of the coupled assembly is accurately aligned.

Referring next to Detail Z of FIG. 9B, a third modular reflector element 830(3) is illustrated as having been engaged by the end effector of the manipulator 950. Referring now to Detail AA, it is illustrated that the manipulator 950 has positioned the third modular element 830(3) proximate to the first modular element 830(1) and the second modular element 830(2) such that the first modular element 830(1), the second modular element 830(2) and the third modular element 830(3) may be coupled together. The coupling may be affected with magnetic, mechanical, adhesive, or localized welding means and may include electrical and/or telemetry connections. Advantageously, the coupling may be affected with self-aligning kinematic interfaces such that the coupled assembly of the first modular element 830(1), the second modular element 830(2) and the third modular element 830(3) is self-supporting, at least in a zero-g on-orbit environment. In some implementations, the self-aligning kinematic interfaces may be configured to control location and orientation of the first modular element 430(1) with respect to the second modular element 430(2) so that a reflective surface of the coupled assembly is accurately aligned.

Referring next to Detail AB of FIG. 9C, spacecraft main body 810 is illustrated as being coupled by arrangement 960 with an antenna reflector portion consisting of seven modular reflector elements 830. For simplicity of illustration, the illustrated reflector portion includes only seven elements, but as described above, reflectors including a substantially larger number of modular elements are also contemplated by the present disclosure.

Figure 10:
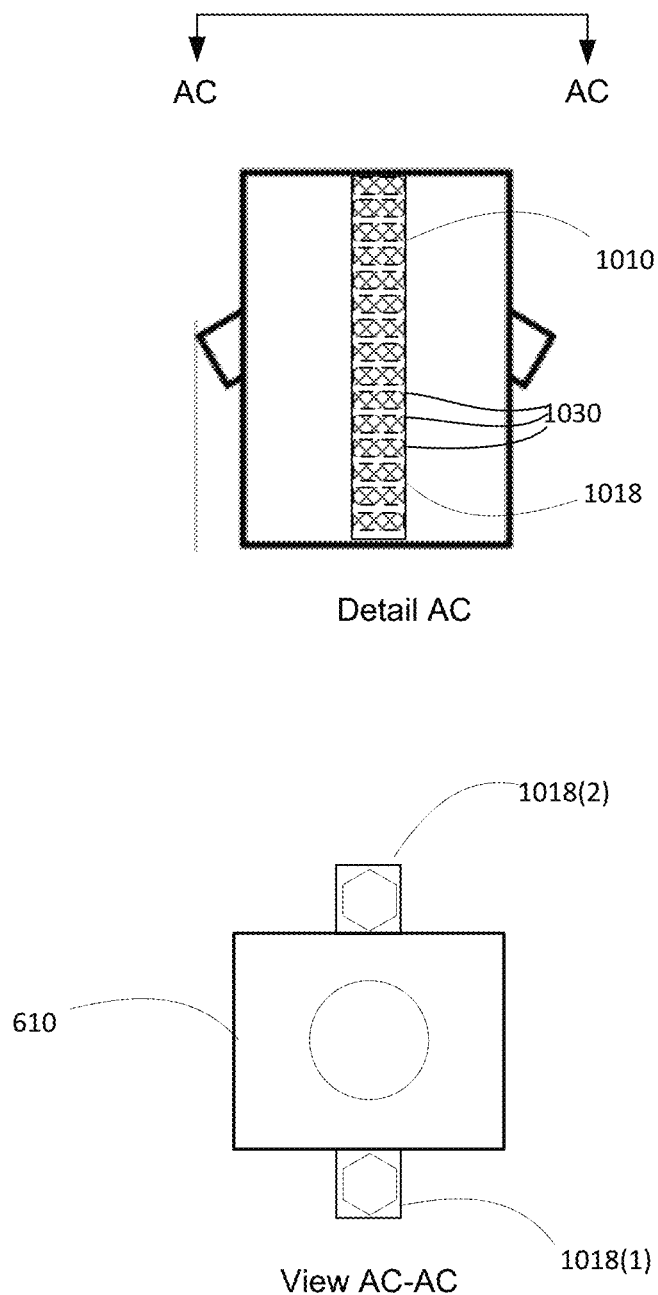
FIG. 10 illustrates an example of a spacecraft reconfigurable from a launch configuration to an on-orbit configuration in accordance with yet another implementation.

FIG. 10 illustrates an example of a spacecraft reconfigurable from a launch configuration to an on-orbit configuration in accordance with yet another implementation. In the illustrated implementation, a first dispenser/storage systems 1018(1) and a second first dispenser/storage systems 1018(2) are respectively disposed, proximate to and outboard of opposite sidewalls of a spacecraft main body 1010. Once on orbit, the modular reflector elements 1030 may be removed from the storage containers 1018 and assembled by the robotic manipulator as described above in connection with FIGS. 9A-9C. The modular elements may utilize kinematic interface alignments and mechanical and/or magnetic mounting hardware to connect to each other and may include electrical and/or telemetry connections. The storage dispenser/storage system 1018 may include dispensing mechanisms or may include only support shelving and/or passive structural support interfaces that are configured to be detached by a manipulator (not illustrated). The storage dispenser/storage systems 1018 may have an approximately square cross section, as illustrated in View AC-AC, but other cross sections are also contemplated by the present disclosure.

Figure 11:
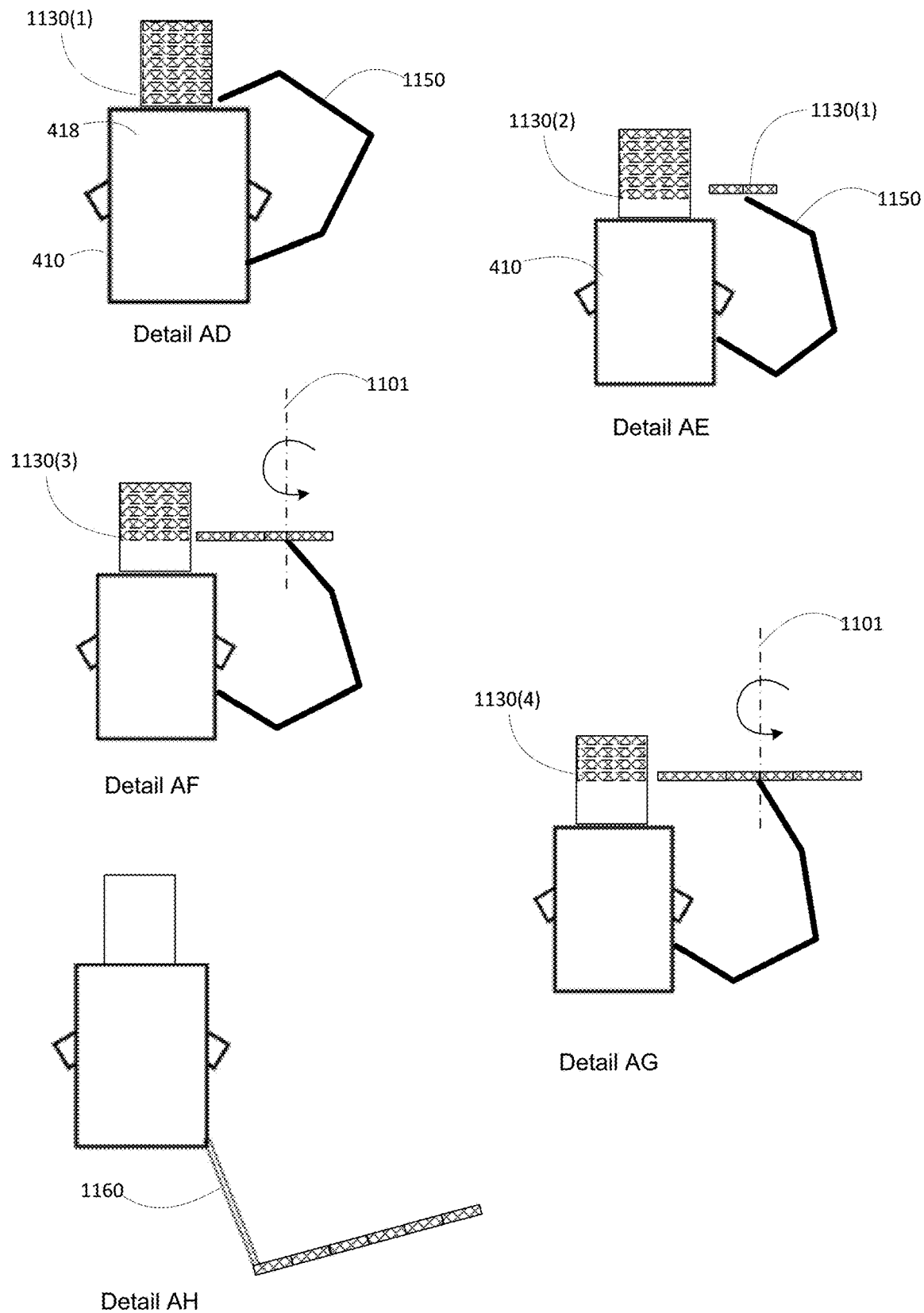
FIG. 11 illustrates an example of techniques wherein a manipulator is used to move a plurality of modular reflector elements from positions associated with the launch configuration to positions associated with the on-orbit configuration in accordance with a yet further implementation.

FIG. 11 illustrates an example of techniques wherein a manipulator 1150 is used to move a plurality of modular reflector elements 1130 from positions associated with the launch configuration to positions associated with the on-orbit configuration. Referring first to Detail AD of FIG. 11, a configuration is illustrated wherein an end effector at a distal portion of the manipulator 1150 has engaged with a first modular element 1130(1). Referring next to Detail AE it is illustrated that the manipulator 1150 has positioned the first modular element 1130(1) such that an edge surface of the first modular element 1130(1) is proximate to an edge surface of a second modular element 1130(2). The respective edges of the first modular element 1130(1) and the second modular element 1130(2) may be coupled together by way of magnetic, mechanical, adhesive, or localized welding means, resulting in the configuration illustrated in detail AF. The coupling means may include electrical and/or telemetry connections. The resulting assembly may be rotated about the axis 1101 (for example, by the manipulator 1150) such that a mating edge of one or both of the first modular element 1130(1) and the second modular element 1130(2) is proximate to an edge surface of a third modular element 1130(3). The foregoing steps may be repeated, Detail AG, until all or a substantial fraction of a fully assembled antenna reflector has been fabricated. Then the antenna reflector may be moved by the manipulator 1150 into an on-orbit configuration coupled with structural arrangement 160, resulting in a configuration illustrated in Detail AH.

Figure 12A:
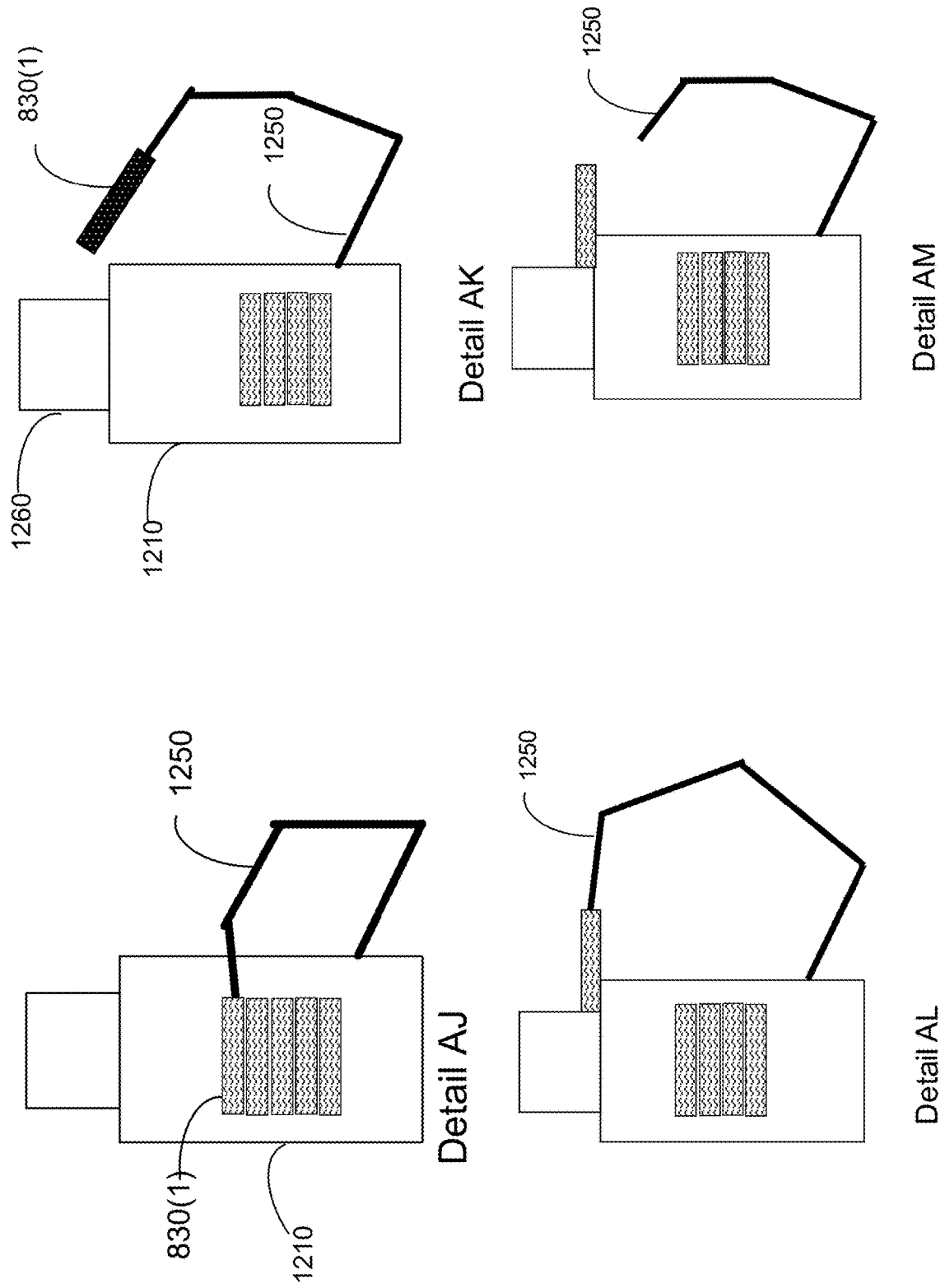
FIGS. 12A-12C illustrate techniques wherein a manipulator is used to move reflector modular elements from positions associated with the launch configuration to positions associated with the on-orbit configuration in accordance with another implementation.
Figure 12B:
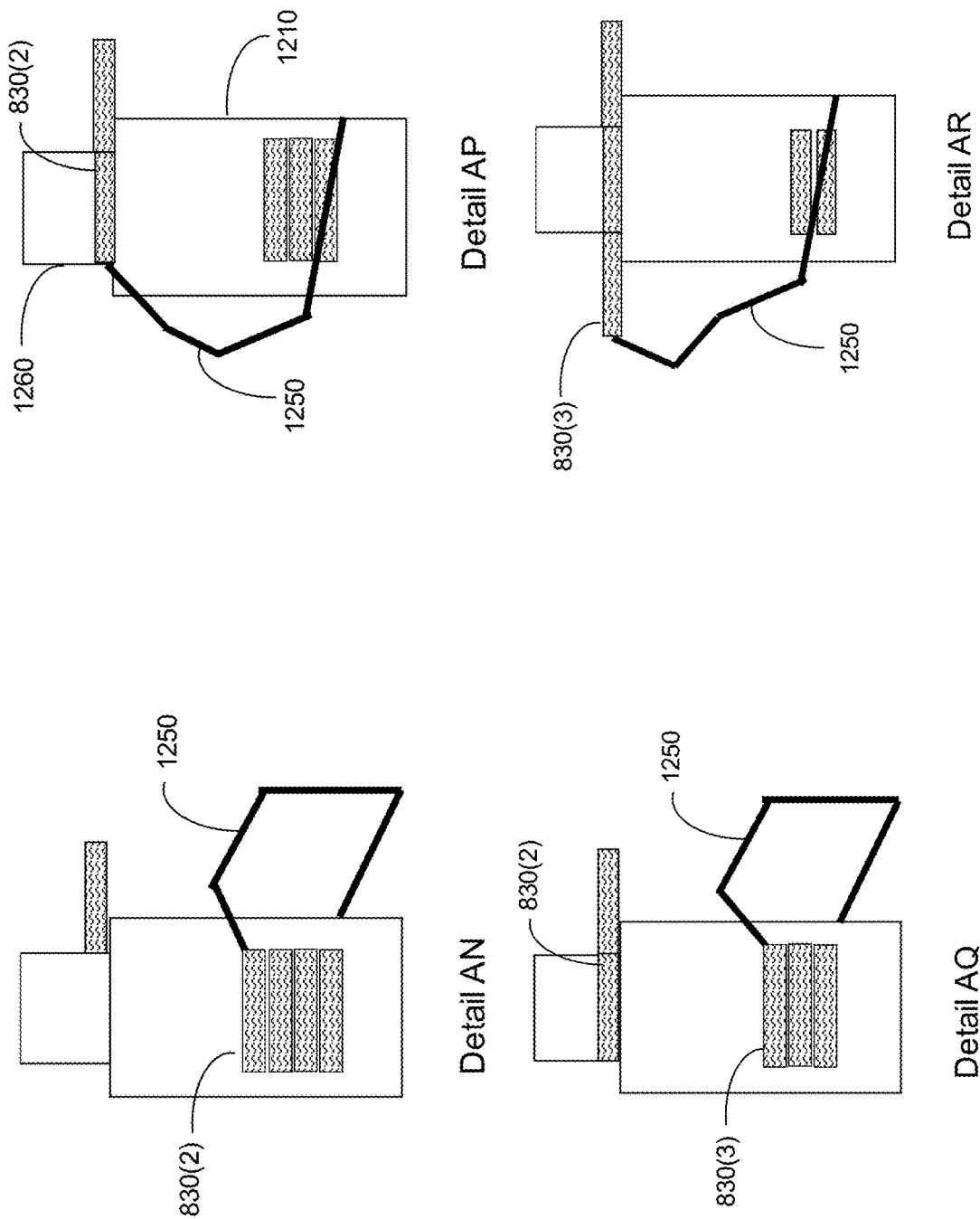
Figure 12C:
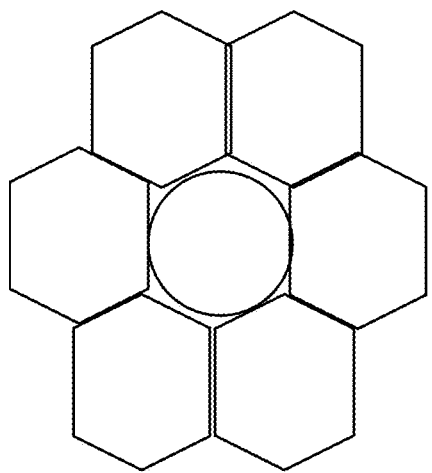
Figure 12C:
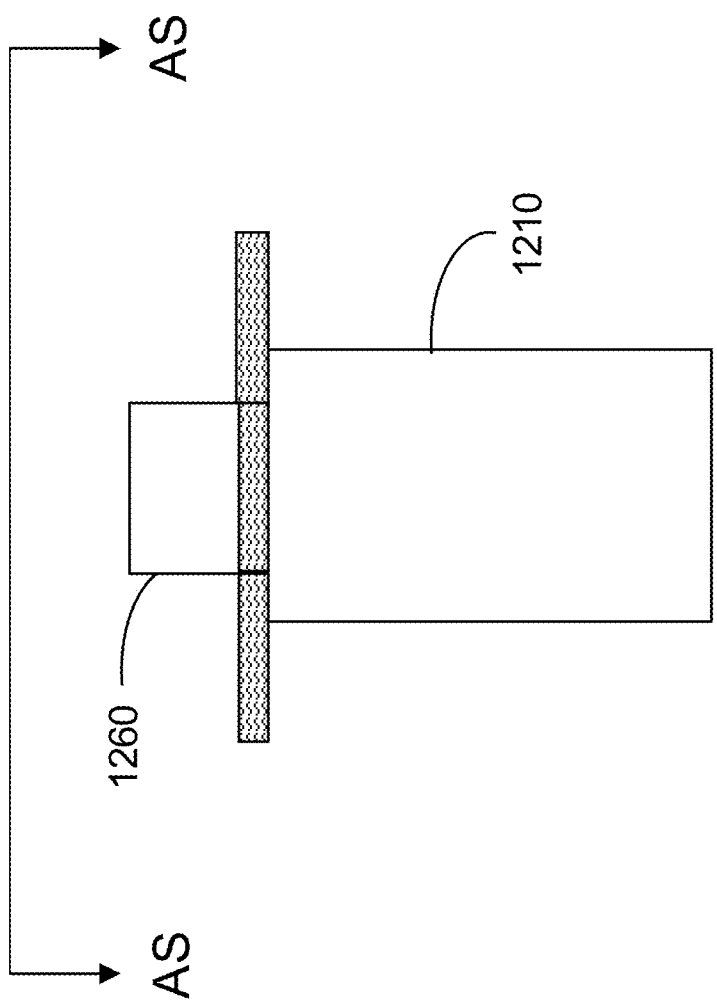

FIGS. 12A-12C illustrate techniques wherein a manipulator 1250 is used to move reflector modular elements 830 from positions associated with the launch configuration to positions associated with the on-orbit configuration. Referring first to Detail AJ of FIG. 12A, a configuration is illustrated wherein an end effector at a distal portion of the manipulator 1250 has engaged with first reflector modular element 830(1). In some implementations, the end effector may be detachably engaged with the first reflector modular element 830(1) by a mechanical arrangement that does not include an electrical or telemetry/command interface between the manipulator 1250 and the first reflector modular element 830(1).

In a second transition configuration illustrated in Detail AK, the reflector modular element 830(1) is depicted as having been translated and rotated, by the manipulator 1250, with respect to the spacecraft main body 810 toward a position consistent with a desired on-orbit configuration on the main body 1210 or a secondary structure 1260 (Detail AL).

Referring now to Detail AL, it is illustrated that the manipulator 1250 has positioned the first reflector modular element 830(1) proximate to a desired on-orbit location on the main body 1210 or a secondary structure 1260. More particularly, in the illustrated configuration, the reflector modular element 830(1) has been positioned such that it may be mechanically attached with the spacecraft body 1210 or the secondary structure 1260. In some implementations, the manipulator 1250 may be configured to attach the reflector modular element 830(1) to the main body 1210 or the secondary structure 1260. Subsequent to attaching the reflector modular element 830(1) to the main body 1210 or the secondary structure 1260, the end effector of the manipulator 1250 may be detached and separated from the reflector modular element 830(1) (Detail AM).

Referring next to Detail AN of FIG. 12B, a second reflector modular element 830(2) is illustrated as having been engaged by the end effector of the manipulator 1250. Referring now to Detail AP, it is illustrated that the manipulator 1250 has positioned the second reflector modular element 830(2) proximate to the first reflector modular element 830(1) such that the first reflector modular element 830(1) and the second reflector modular element 830(2) may be coupled together. The coupling may be affected with magnetic, mechanical, adhesive, or localized welding means and may include electrical and/or telemetry connections.

Referring next to Detail AQ of FIG. 12B, a third reflector modular element 830(3) is illustrated as having been engaged by the end effector of the manipulator 1250. Referring now to Detail AR, it is illustrated that the manipulator 1250 has positioned the third reflector modular element 830(3) proximate to the first reflector modular element 830(1) and/or the second reflector modular element 830(2) such that the first reflector modular element 830(1), the second reflector modular element 830(2) and the third reflector modular element 830(3) may be coupled together. The coupling may be affected with magnetic, mechanical, adhesive, or localized welding means and may include electrical and/or telemetry connections.

Referring next to Detail AS of FIG. 12C, the spacecraft main body 1210 and/or the secondary structure 1260 is illustrated as being coupled with a reflector portion consisting of seven reflector modular elements 830. For simplicity of illustration, the illustrated reflector portion includes only seven elements, but as described above, reflectors including a substantially larger number of modular elements are also contemplated by the present disclosure.

Figure 12D:
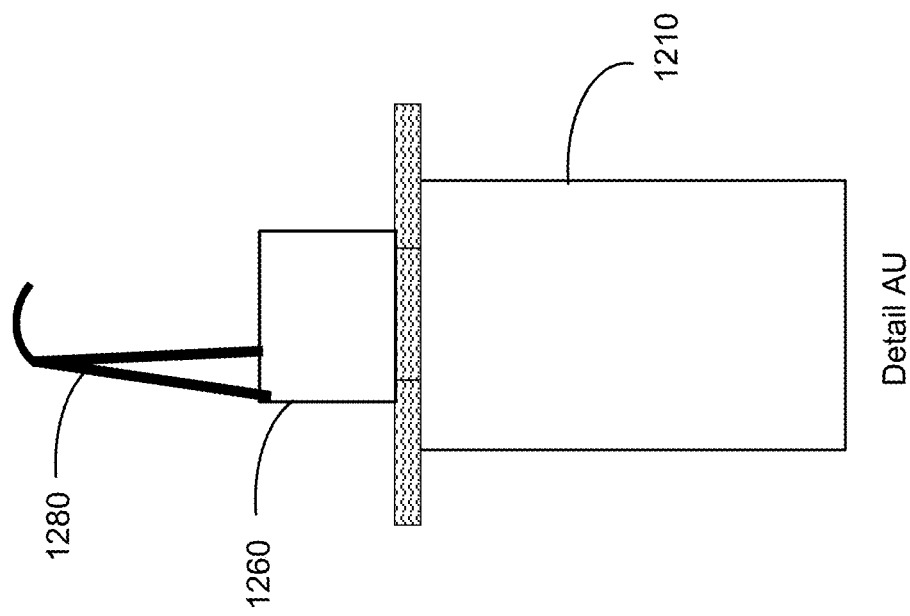
FIG. 12D illustrates examples of secondary optical arrangements in accordance with an implementation.
Figure 12D:
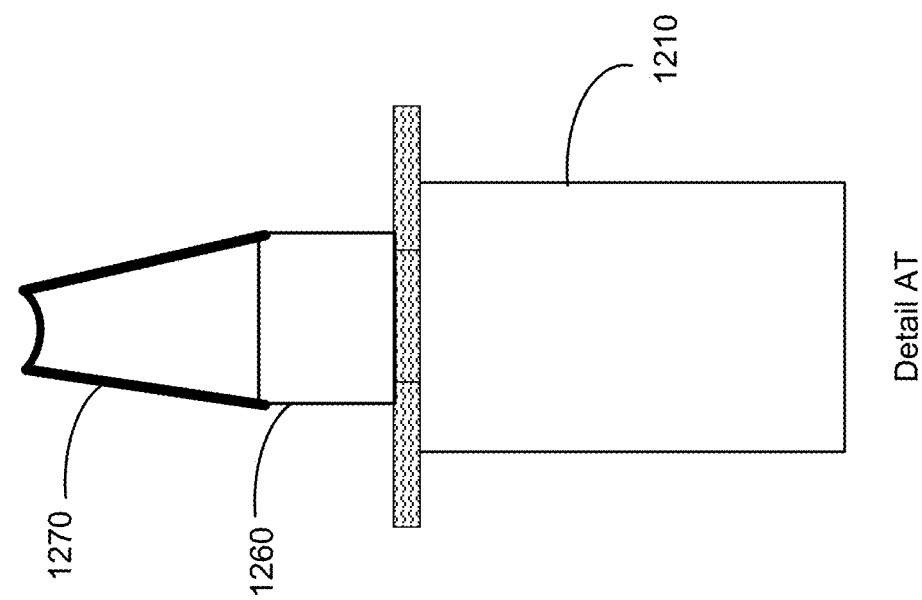

Referring now to FIG. 12D, example implementations are illustrated that include secondary optical arrangements. The secondary optical arrangements, including optics and associated structures may or may not be assembled using manipulators as described above in connection with the assembly of modular elements 830. Referring to Detail AT, an example of a secondary optical arrangement 1270 that includes a convex secondary reflector (subreflector) is illustrated. Referring to Detail AU, an example of a secondary optical arrangement 1280 that includes a concave secondary reflector (subreflector) is illustrated.

Figure 13:
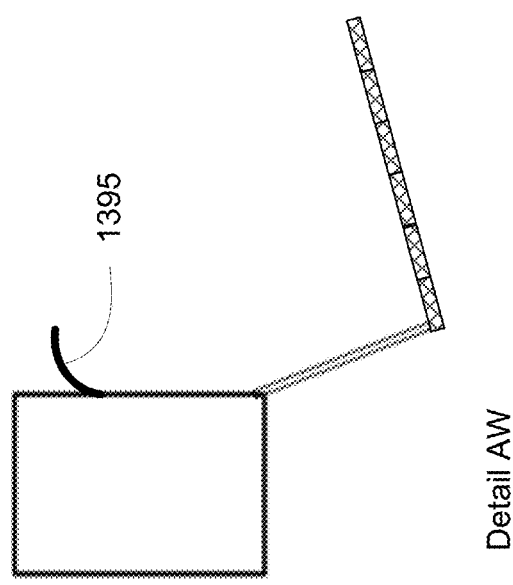
FIG. 13 illustrates arrangements of secondary optical arrangements in accordance with another implementation.
Figure 13:
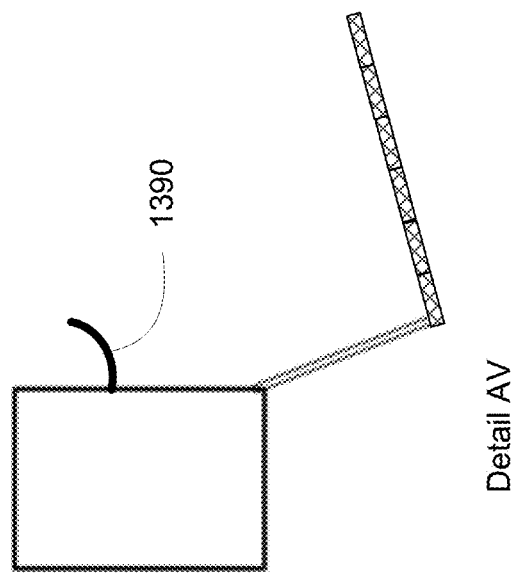

Referring now to FIG. 13, implementations, having been assembled in similar fashion to the arrangements in FIGS. 9A thru 9C, are illustrated that include secondary optical arrangements. The secondary optical arrangements, including optics and associated structures, may or may not be assembled using manipulators as described above in connection with the assembly of modular elements 830. Referring to Detail AV, an example of a secondary optical arrangement 1390 that includes a convex secondary reflector (subreflector) is illustrated. Referring to Detail AW, an example of a secondary optical arrangement 1395 that includes a concave secondary reflector (subreflector) is illustrated.

Figure 14:
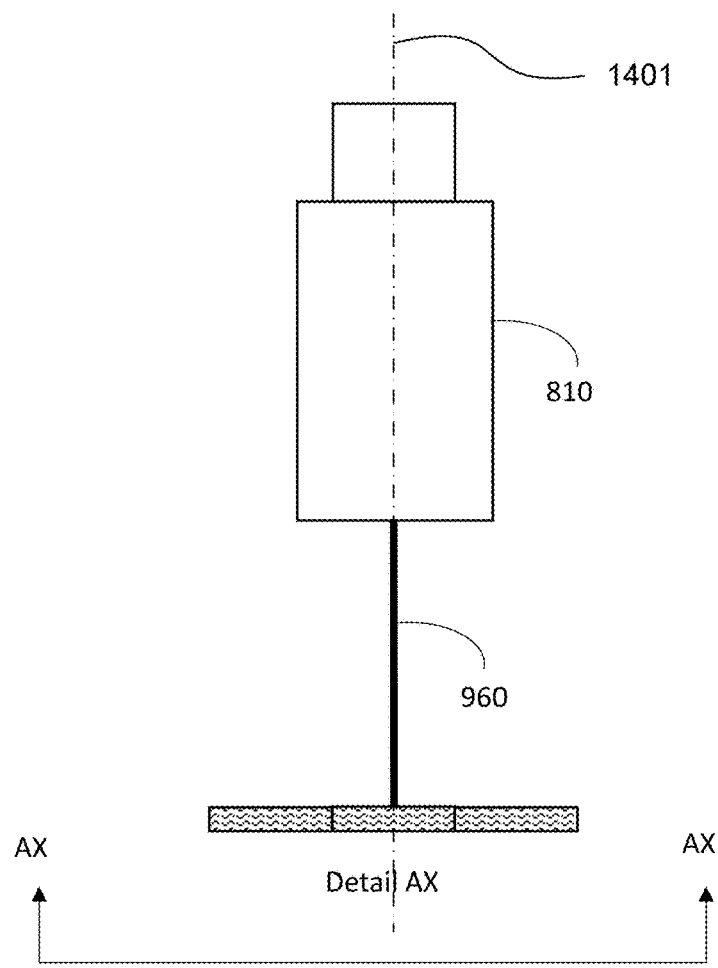
FIG. 14 illustrates a spacecraft in an on-orbit configuration in accordance with a yet further implementation.
Figure 14:
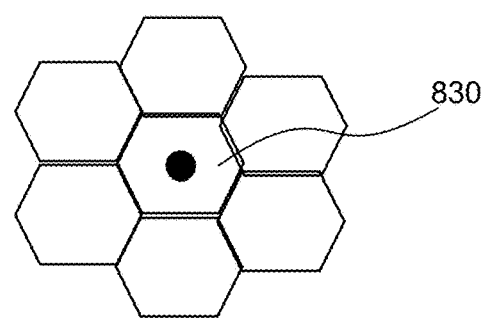

FIG. 14 illustrates a spacecraft in an on-orbit configuration according to a yet further implementation. Referring to Detail AX of FIG. 14, spacecraft main body 810 is illustrated as being coupled by arrangement 960 with an antenna reflector portion consisting of seven modular reflector elements 830. For simplicity of illustration, the illustrated reflector portion includes only seven elements, but as described above, reflectors including a substantially larger number of modular elements are also contemplated by the present disclosure. In the illustrated implementations, spacecraft main body 810 is illustrated as being coupled with the antenna reflector portion by arrangement 960. The arrangement 960 may be coupled with a central modular element 830 of the antenna reflector portion that is aligned, together with the spacecraft main body 810, along axis 1401.

Figure 15:
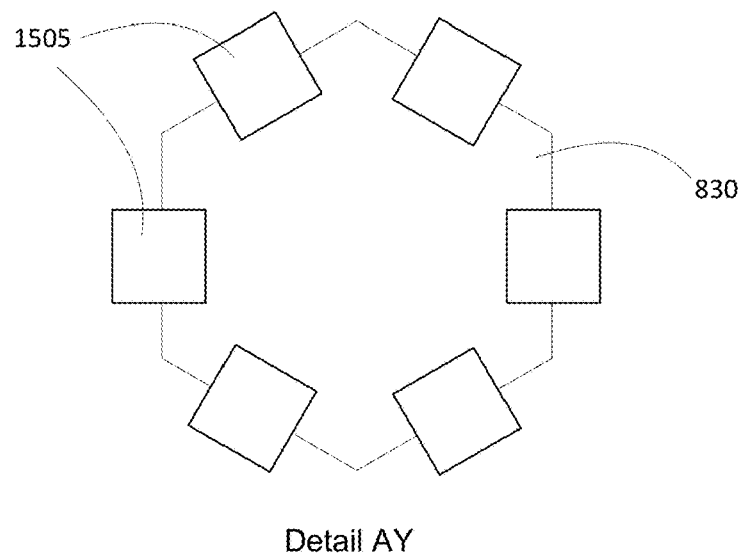
FIG. 15 illustrates an example of a self-aligning interface that may couple adjacent modular elements, in accordance with an implementation.
Figure 15:
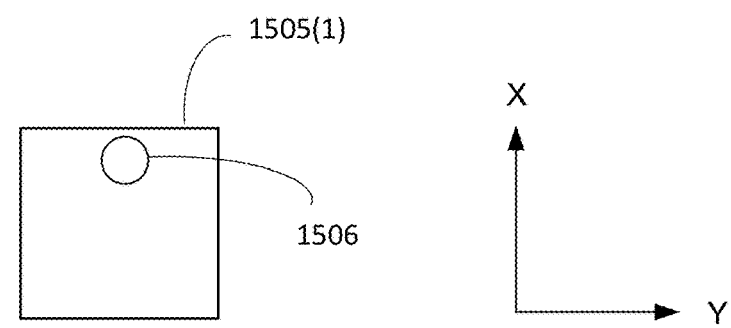
Figure 15:
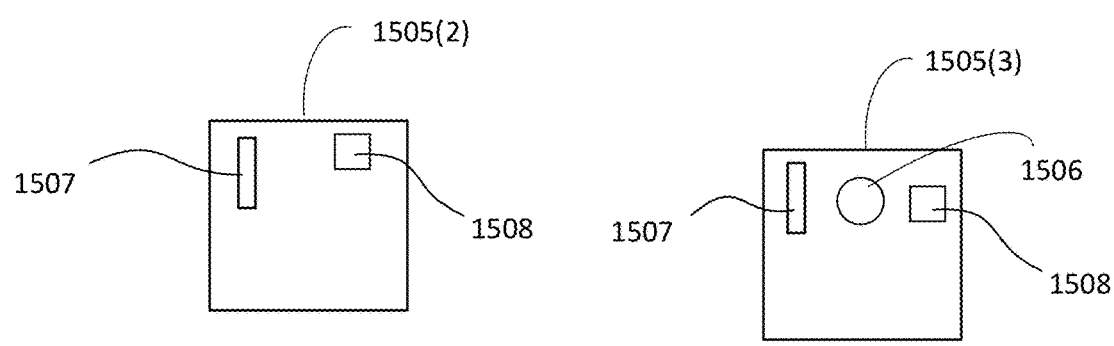

FIG. 15 illustrates an example of a self-aligning interface that may couple adjacent modular elements. Referring to Detail AY, a modular element 830 may be coupled with one or more adjacent modular elements (not illustrated) by way of one or more interface tabs 1505. In the illustrated implementation, six interface tabs 1505 are depicted, each disposed proximate to a respective edge of the modular element 830. A greater or lesser number of interface tabs may be contemplated. For example some edges may have two or more interface tabs disposed proximate thereto and some edges may have no interface tabs disposed proximate thereto. The interface tabs 1505 may be configured to properly locate and restrain a self-supporting assembly of modular reflector elements. The interface tabs may utilize mechanical and/or magnetic features to restrict the movement and location of adjacent modular elements by restraining them in specific degrees of freedom. For example, referring to Detail AZ, mechanical and/or magnetic features 1506, 1507 and 1508 may be included and arranged in a specific manner to restrain one or more degrees of freedom. For example, one degree of freedom may be restrained by feature 1506 of interface tab 1505(1), two degrees of freedom may be restrained by features 1507 and 1508 of interface tab 1505(2) and three degrees of freedom may be restrained by features 1506, 1507 and 1508 of interface tab 1505(3).

Figure 16:
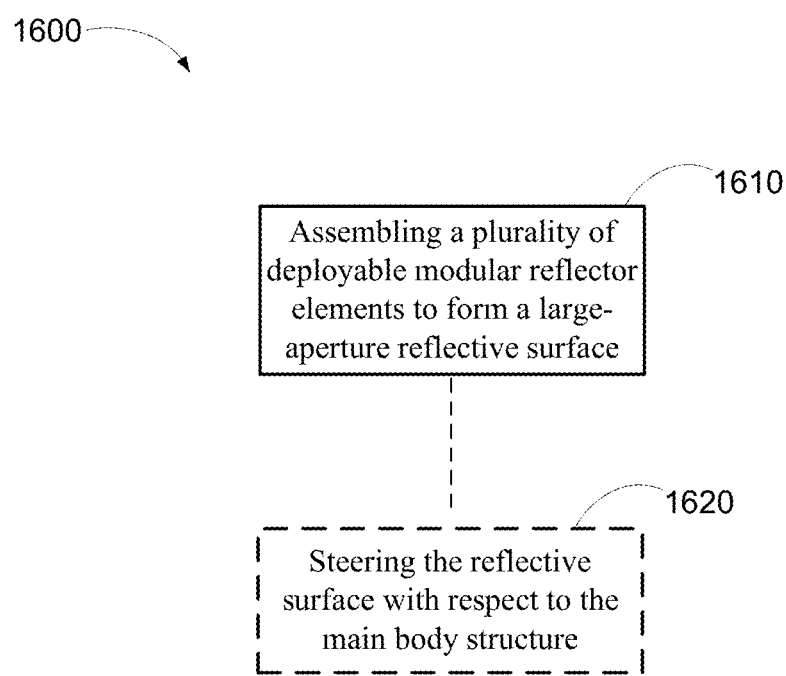
FIG. 16 illustrates a method for reconfiguring a spacecraft from a launch configuration to an on-orbit configuration, in accordance with an implementation.

Referring now to FIG. 16, a method for reconfiguring a spacecraft from a launch configuration to an on-orbit configuration will be described. The illustrated method 1600 includes a step 1610 of assembling a plurality of deployable modular reflector elements to form a large aperture reflective surface. As described hereinabove, in the launch configuration, the modular elements may be disposed in a storage system that includes an arrangement for supporting the reflector modular elements with respect to dynamic launch loads. The step 1610, in some implementations, may be executed using a robotic manipulator configured to assemble the large aperture reflector from the plurality of deployable modular reflector elements. The spacecraft may include the robotic manipulator, in some implementations. Alternatively, or in addition, a portion or all of step 1610 may be executed using a robotic manipulator that is part of a different spacecraft.

Advantageously, in the on-orbit configuration, the large aperture reflective surface may be self-supporting. In some implementations, assembling the modular elements coupling adjacent modular elements with one or both of a self-aligning kinematic interface and a magnetic interface. Optionally, in some implementations the method 1600 may include a step 1620 of steering the reflective surface with respect to the main body structure.

Thus, improved techniques for reconfiguring a satellite from a launch configuration to an on-orbit configuration by robotically assembling a large antenna reflector subsequent to launch have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:
1. A spacecraft comprising:
a main body structure;
a plurality of deployable modular reflector elements, the spacecraft being reconfigurable from a launch configuration to an on-orbit configuration; and
a robotic manipulator configured to assemble a large-aperture, offset fed, reflector from the plurality of deployable modular reflector elements, wherein:
in the launch configuration, the modular reflector elements are disposed in a storage system that includes an arrangement for supporting the modular reflector elements with respect to dynamic launch loads; and
in the on-orbit configuration, an assembly of the plurality of modular reflector elements forms the large-aperture, offset fed, reflector, the reflector being coupled with a boom or yoke with the main body structure by way of a two or three axis positioning mechanism configured to steer the reflector with respect to the main body structure.

2. The spacecraft of claim 1, wherein the robotic manipulator includes:
   a first end effector configured to connect with a grappling fixture of the main body structure that provides an electrical and telemetry/command interface between the manipulator and the main body; and
   a second end effector configured to detachably engage at least one of the plurality of modular reflector elements by a mechanical arrangement that does not include an electrical or telemetry/command interface between the manipulator and the at least one modular reflector element.

3. The spacecraft of claim 1, wherein the assembly of the modular reflector elements includes one or both of self-aligning kinematic and magnetic interfaces that couple adjacent modular elements.

4. The spacecraft of claim 3, wherein, in the on-orbit configuration, the plurality of deployable modular reflector elements are assembled such that the reflector is substantially self-supporting.

5. The spacecraft of claim 4, wherein the self-aligning kinematic and magnetic interfaces result in couplings between modular reflector elements that are sufficiently rigid and well-aligned to provide a satisfactory optical surface without recourse to external mechanical support structures.

6. The spacecraft of claim 1, wherein the assembly of the modular reflector elements includes couplings between adjacent modular elements, the couplings including one or more of magnetic, mechanical, adhesive, and welded interface.

7. The spacecraft of claim 1, wherein the assembly of the modular reflector elements includes couplings between adjacent modular elements, the couplings including one or both of electrical and telemetry connections.

8. The spacecraft of claim 1, wherein, in the on-orbit configuration, the plurality of deployable reflector module elements are disposed in a geometrically nested arrangement such that facing edges of adjacent reflector module elements are substantially parallel and separated by little or no gap.

9. A spacecraft comprising:
   a main body structure;
   a plurality of deployable modular reflector elements, the spacecraft being reconfigurable from a launch configuration to an on-orbit configuration; and
   a robotic manipulator configured to assemble a large-aperture, offset fed, reflector from the plurality of deployable modular reflector elements, wherein:
   in the launch configuration, the modular reflector elements are disposed in a storage system that includes an arrangement for supporting the modular reflector elements with respect to dynamic launch loads; and
   in the on-orbit configuration, the plurality of modular reflector elements are assembled by the robotic manipulator to form a large aperture reflective surface that is self-supporting, and the reflective surface is coupled with a deployable boom or yoke to the main body structure.

10. The spacecraft of claim 9, wherein, in the on-orbit configuration, the reflective surface is coupled with the boom or yoke to the main body structure by a two or three axis positioning mechanism configured to steer the reflective surface with respect to the main body structure.

11. The spacecraft of claim 9, wherein, in the on-orbit configuration, the reflective surface is fixedly coupled with the boom or yoke to the main body structure.

12. The spacecraft of claim 9, wherein the reflective surface is disposed in an optical configuration suitable to one or both of electromagnetic energy reception and electromagnetic energy transmission, the optical configuration being one or a combination of off-axis, prime focus, Newtonian, Gregorian, Cassegrain, Coude, and axial/front feed configurations.

13. The spacecraft of claim 9, wherein the reflective surface has a direct structural coupling to the main body structure or a secondary structure connected to the main body structure, the direct structural coupling excluding a deployable boom or yoke.

14. The spacecraft of claim 9, wherein the reflective surface has an articulable coupling to the main body structure or a secondary structure connected to the main body structure, the articulable coupling including a two or three axis positioning mechanism configured to steer the reflective surface with respect to the main body structure, the articulable coupling excluding a deployable boom or yoke.

15. A method for reconfiguring a first spacecraft from a launch configuration to an on-orbit configuration, the method comprising:
   assembling a plurality of deployable modular reflector elements to form a large-aperture reflective surface coupled with a deployable boom or yoke to the main body structure, wherein:
   the first spacecraft includes a main body structure;
   in the launch configuration, the modular reflector elements are disposed in a storage system that includes an arrangement for supporting the reflector modular elements with respect to dynamic launch loads; and
   in the on-orbit configuration, the large-aperture reflective surface is self-supporting; and
   assembling the plurality of deployable modular reflector elements includes using one or more robotic manipulators configured to assemble the large-aperture reflective surface from the plurality of deployable modular reflector elements.

16. The method of claim 15, further comprising steering the large aperture reflective surface with respect to the main body structure.

17. The method of claim 16, wherein at least one of the robotic manipulators is disposed on a second spacecraft, separate from the first spacecraft.

* * * * *